(12) United States Patent
Green et al.

(10) Patent No.: US 11,071,986 B2
(45) Date of Patent: Jul. 27, 2021

(54) INFEED SYSTEMS FOR CHIPPERS OR GRINDERS, AND CHIPPERS AND GRINDERS HAVING SAME

(71) Applicant: Vermeer Manufacturing Company, Pella, IA (US)

(72) Inventors: Aaron Green, Sunnyvale, CA (US); Benjamin Helland, Pella, IA (US); Joshua Magill, Polk City, IA (US)

(73) Assignee: Vermeer Manufacturing Company, Pella, IA (US)

( * ) Notice: Subject to any disclaimer, the term of this patent is extended or adjusted under 35 U.S.C. 154(b) by 422 days.

(21) Appl. No.: 16/103,633

(22) Filed: Aug. 14, 2018

(65) Prior Publication Data

US 2019/0054476 A1 Feb. 21, 2019

Related U.S. Application Data

(60) Provisional application No. 62/545,735, filed on Aug. 15, 2017.

(51) Int. Cl.
*B02C 25/00* (2006.01)
*A01G 3/00* (2006.01)
(Continued)

(52) U.S. Cl.
CPC .............. *B02C 25/00* (2013.01); *A01G 3/002* (2013.01); *B02C 18/225* (2013.01); *B02C 18/2283* (2013.01); *B02C 23/02* (2013.01)

(58) Field of Classification Search
CPC .... A01G 3/002; B02C 23/02; B02C 18/2266; B02C 18/225; B02C 18/2283; B02C 21/02; B02C 25/00
See application file for complete search history.

(56) References Cited

U.S. PATENT DOCUMENTS 3,542,302 A 11/1970 Salzmann
3,593,807 A 7/1971 Klima
(Continued)

FOREIGN PATENT DOCUMENTS

GB 607276 A 8/1948
GB 843184 A 8/1960

OTHER PUBLICATIONS

International Search Report and Written Opinion for Application No. PCT/US2018/046782 dated Oct. 26, 2018 (14 pages).
(Continued)

*Primary Examiner* — Gregory D Swiatocha
(74) *Attorney, Agent, or Firm* — Michael Best & Friedrich LLP

(57) ABSTRACT

An infeed system of a chipper or grinder includes a feed roller, a motor for rotating the roller, a hydraulic cylinder for adjusting an amount of crush force applied by the roller, a sensor, and a controller in data communication with the sensor and the cylinder. In operation, the controller determines whether the material is being effectively moved to the processing portion and whether the amount of crush force is at a maximum or lowest setting. The controller causes the cylinder to: (a) decrease the amount of crush force when the material is being effectively moved to the processing portion and the amount of crush force applied is not at the lowest setting; and (b) increase the amount of crush force when the material is not being effectively moved to the processing portion and the amount of crush force is not at the maximum setting.

25 Claims, 15 Drawing Sheets

(51) Int. Cl.
*B02C 18/22* (2006.01)
*B02C 23/02* (2006.01)

(56) References Cited

U.S. PATENT DOCUMENTS

| | | | |
|---|---|---|---|
| 3,623,320 A | 11/1971 | Moore | |
| 3,734,202 A | 5/1973 | Gyongyosi | |
| 3,779,323 A | 12/1973 | Horten et al. | |
| 3,861,602 A | 1/1975 | Smith et al. | |
| 3,894,606 A | 7/1975 | Hunck et al. | |
| 3,903,697 A | 9/1975 | Snyder et al. | |
| 4,034,918 A | 7/1977 | Culbertson et al. | |
| 4,064,950 A | 12/1977 | Salmi et al. | |
| 4,271,914 A | 6/1981 | Dressel | |
| 4,368,391 A | 1/1983 | Hellouin de Menibus | |
| 4,442,877 A | 4/1984 | Uitermarkt | |
| 4,485,623 A | 12/1984 | Chichester et al. | |
| 4,585,042 A | 4/1986 | Hutson et al. | |
| 4,921,219 A | 5/1990 | Ottemann et al. | |
| 5,005,620 A | 4/1991 | Morey | |
| 5,088,532 A | 2/1992 | Eggers et al. | |
| 5,205,496 A | 4/1993 | O'Donnell et al. | |
| 5,211,015 A | 5/1993 | Schroeder | |
| 5,692,548 A | 12/1997 | Bouwers et al. | |
| 5,692,549 A | 12/1997 | Eggers | |
| 5,913,371 A | 6/1999 | Jenne | |
| 5,947,395 A | 9/1999 | Peterson et al. | |
| 5,975,443 A | 11/1999 | Hundt et al. | |
| 6,135,176 A | 10/2000 | Smith | |
| 6,138,932 A | 10/2000 | Moore | |
| 6,293,479 B1 | 9/2001 | Kaczmarski et al. | |
| 6,299,082 B1 | 10/2001 | Smith | |
| RE37,923 E | 12/2002 | Keating et al. | |
| 6,732,813 B1 | 5/2004 | Eklof | |
| 6,840,471 B2 | 1/2005 | Roozeboom et al. | |
| 7,011,258 B2 | 3/2006 | O'Halloran et al. | |
| 7,070,132 B1 | 7/2006 | Gassman | |
| 7,077,345 B2 | 7/2006 | Byram et al. | |
| 7,134,511 B2 | 11/2006 | Mayr et al. | |
| 7,213,779 B2 | 5/2007 | Roozeboom et al. | |
| 7,413,031 B2 | 8/2008 | Koch et al. | |
| 7,441,718 B2 | 10/2008 | Seaman et al. | |
| 7,441,719 B2 | 10/2008 | Verhoef et al. | |
| 7,481,386 B2 * | 1/2009 | Hartzler | B02C 18/2283 241/34 |
| 7,546,964 B2 | 6/2009 | Bouwers | |
| 7,637,444 B2 | 12/2009 | Stelter et al. | |
| 7,780,102 B2 | 8/2010 | Majkrzak | |
| 7,954,736 B2 | 6/2011 | Kallenbach | |
| 8,146,681 B2 | 4/2012 | Heemann et al. | |
| 8,387,377 B2 | 3/2013 | Loewe et al. | |
| 8,408,328 B2 | 4/2013 | Wrede et al. | |
| 8,684,291 B2 | 4/2014 | Galloway et al. | |
| 8,851,112 B2 | 10/2014 | Nelson | |
| 8,943,819 B2 | 2/2015 | Knussman | |
| 9,533,310 B2 * | 1/2017 | Dumpor | B02C 18/2225 |
| 2002/0070301 A1 | 6/2002 | Stelter et al. | |
| 2003/0111566 A1 * | 6/2003 | Seaman | B02C 18/2283 241/34 |
| 2007/0108323 A1 * | 5/2007 | Chapman | A01G 3/002 241/30 |
| 2008/0237377 A1 | 10/2008 | Majkrzak | |
| 2009/0020050 A1 | 1/2009 | Bange et al. | |
| 2009/0025947 A1 | 1/2009 | Peltonen | |
| 2009/0152386 A1 | 6/2009 | Stelter et al. | |
| 2009/0308067 A1 | 12/2009 | Meier et al. | |
| 2010/0001107 A1 | 1/2010 | Kallenbach | |
| 2010/0319335 A1 | 12/2010 | Schneider et al. | |
| 2011/0006142 A1 | 1/2011 | Galloway et al. | |
| 2012/0055715 A1 | 3/2012 | Wrede et al. | |
| 2012/0285157 A1 | 11/2012 | Olkano et al. | |
| 2013/0061588 A1 | 3/2013 | Jagoda | |
| 2013/0111893 A1 | 5/2013 | Edward | |
| 2013/0213026 A1 | 8/2013 | Yamamoto et al. | |
| 2014/0031185 A1 | 1/2014 | Bradley et al. | |
| 2014/0076981 A1 | 3/2014 | Hessler | |
| 2014/0234130 A1 | 8/2014 | Yamaoka et al. | |
| 2015/0038201 A1 * | 2/2015 | Brinkmann | A01F 12/40 460/112 |
| 2015/0048188 A1 | 2/2015 | Harsia | |
| 2017/0165674 A1 * | 6/2017 | Harrison | B02C 23/18 |

OTHER PUBLICATIONS

International Search Report and Written Opinion for Application No. PCT/US2017/030647 dated Nov. 28, 2017 (20 pages).

BEFCO, "Bushmaster BM6-800 chipper," <http://www.befco.com/products/bushmaster/bm6-800.html> webpage publically available at least as early as Sep. 18, 2010.

International Preliminary Report on Patentability from the International Patent Office for Application No. PCT/US2018/046782 dated Sep. 16, 2019 (10 pages, including six (6) sheets of amended claims).

Amendments and Remarks under PCT Article 34(2) and PCT Rules 66.1(b) and 66.3 for Application No. PCT/US2018/046782 submitted Jan. 11, 2019 (16 pages).

* cited by examiner

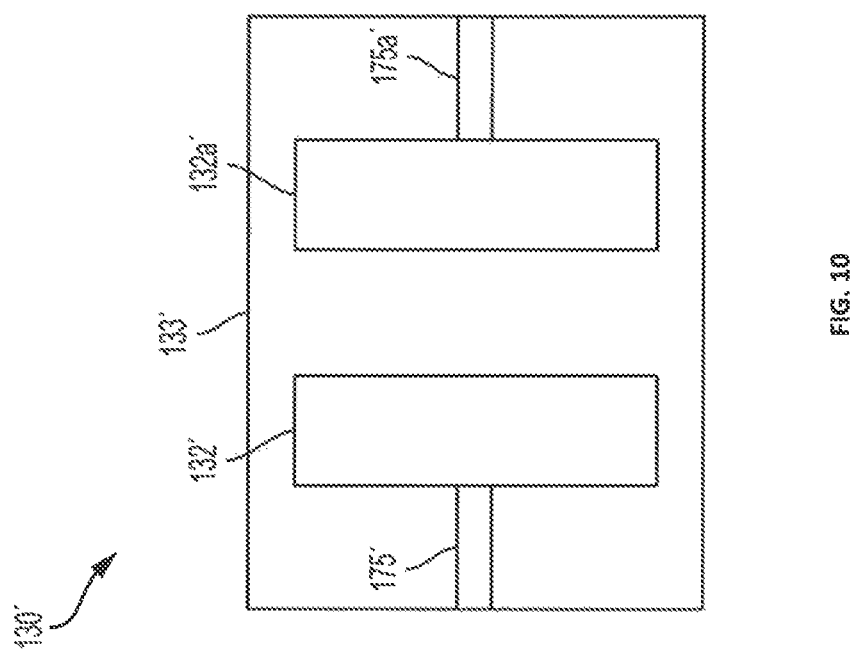

INFEED SYSTEMS FOR CHIPPERS OR GRINDERS, AND CHIPPERS AND GRINDERS HAVING SAME

CROSS-REFERENCE TO RELATED APPLICATIONS

This claims priority to U.S. Provisional Patent Application No. 62/545,735, filed on Aug. 15, 2017, the entire contents of which are fully incorporated herein by reference.

BACKGROUND

Chippers and grinders are devices used to process items into smaller pieces. Chippers typically contain a chipping "drum" including cutting elements that cut items such as whole trees and branches into smaller woodchips. Grinders, on the other hand, typically contain hammers which crush aggregate material into smaller pieces through repeated blows. Example prior art chippers are shown in U.S. Pat. Nos. 8,684,291; 7,637,444; 7,546,964; 7,011,258; 6,138,932; 5,692,549; 5,692,548; 5,088,532; and 4,442,877; and US 2014/0031185, each owned by Vermeer Manufacturing Company; and are incorporated herein in their entirety and form part of the current disclosure. Example grinders are disclosed in U.S. Pat. Nos. 7,441,719; 7,213,779; 7,077,345; and 6,840,471, each owned by Vermeer Manufacturing Company; and are incorporated herein in their entirety and form part of the current disclosure as well.

Chippers and grinders often include infeed systems for moving items to the cutting drum or hammers to be processed. Some embodiments discussed relate particularly to improved infeed systems for chippers and grinders, to chippers and grinders having such improved infeed systems, and to methods of operation.

SUMMARY OF THE INVENTION

The following presents a simplified summary of embodiments in order to provide a basic understanding of some aspects discussed herein. This summary is not an extensive overview of all aspects. It is not intended to identify critical elements of embodiments or to delineate the scope of embodiments. Its sole purpose is to present some concepts of embodiments in a simplified form as a prelude to the more detailed description that is presented elsewhere.

According to an embodiment, an infeed system is provided for a chipper or grinder. The chipper or grinder may include a hydraulic cylinder operatively connected to a feed roller and configured for adjusting an amount of crush force applied by the feed roller onto the material. The infeed system may include a sensor monitoring an operating condition of the chipper and/or effectiveness of movement of the material by the chipper or grinder. A controller of the chipper or grinder may be in data communication with the sensor and the hydraulic cylinder and may be configured to implement the steps of: (a) determine, from data received by the sensor whether the material is being effectively moved to the reducing portion, (b) control the hydraulic cylinder to decrease the amount of crush force applied when the controller determines that the material is being effectively moved to the reducing portion, (c) control the hydraulic cylinder to increase the amount of crush force applied when the controller determines that the material is not being effectively moved to the reducing portion, and (d) continuously repeat the steps of (a)-(c) to optimize the force applied by the feed roller to the material while feeding the material toward the reducing portion.

According to another embodiment, a method for infeed control for a chipper or grinder, may include the steps of (a) monitoring a sensor to determine whether a material is being effectively moved toward a reducing portion of the chipper or grinder; (b) controlling a hydraulic cylinder to decrease the amount of crush force applied by the feed roller when the material is being effectively moved to the reducing portion; (c) controlling the hydraulic cylinder to increase the amount of crush force applied when the material is not being effectively moved to the reducing portion; and (d) continuously repeating the steps of (a)-(c) to optimize the crush force and the rotational force applied by the feed roller to the material while feeding the item toward the reducing portion.

Other features and aspects of the invention will become apparent by consideration of the following detailed description and accompanying drawings.

BRIEF DESCRIPTION OF THE DRAWINGS

FIG. 10 is a top schematic view of part of an infeed system from an alternate embodiment of the chipper of FIG. 1.

Figure 1:
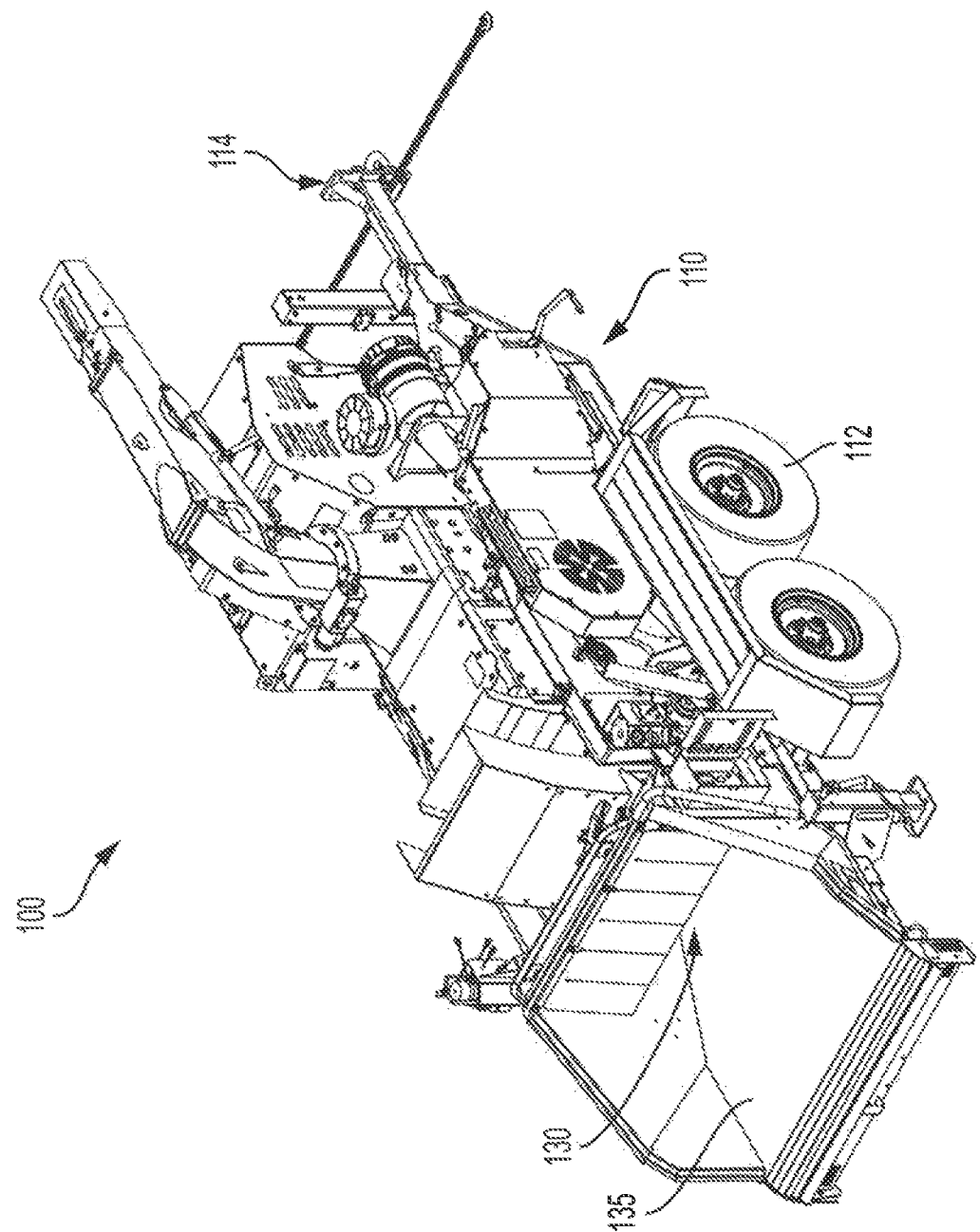
FIG. 1 is a perspective view of a chipper according to embodiments.
Figure 2:
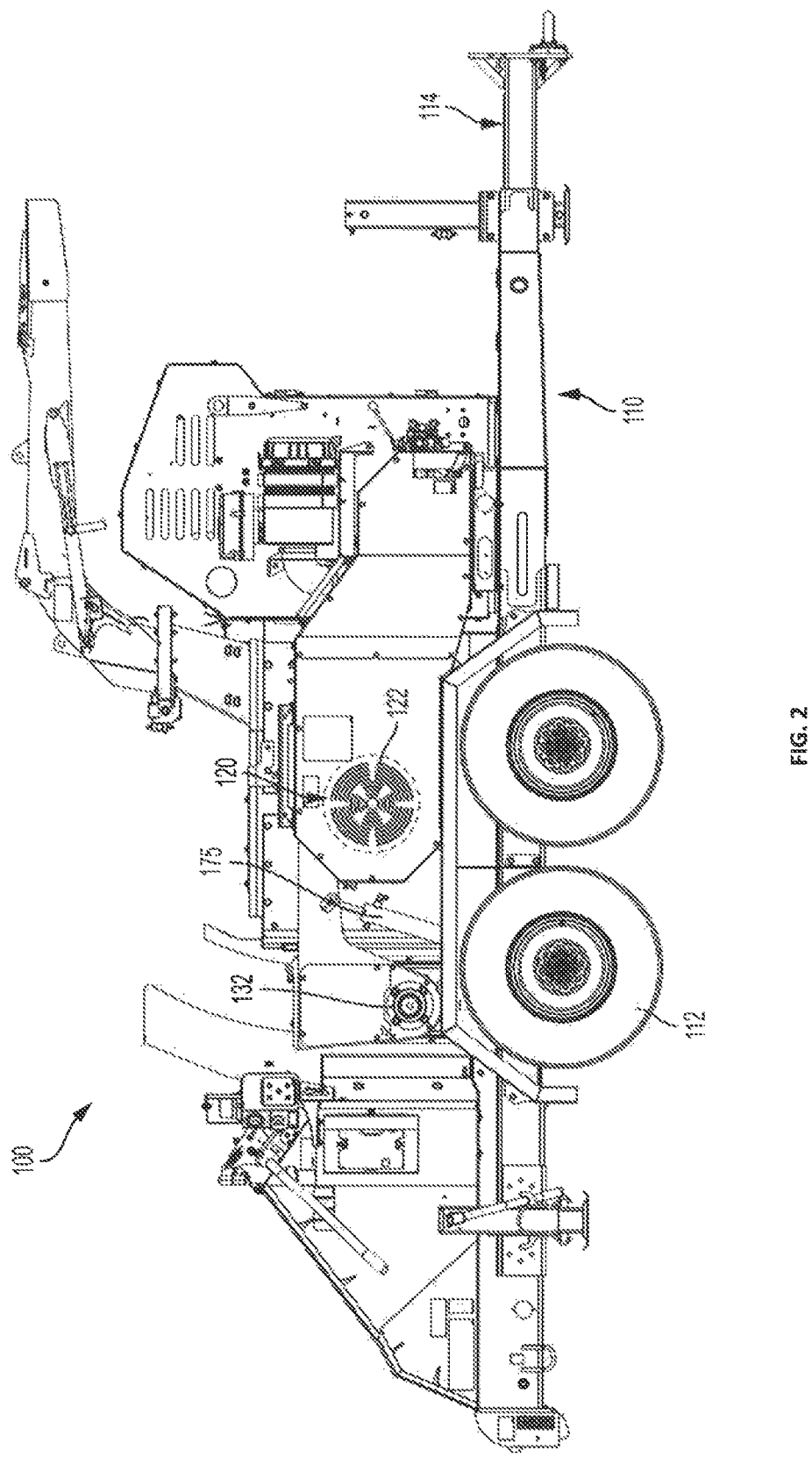
FIG. 2 is a side view of the chipper of FIG. 1, with portions removed for illustration.
Figure 3:
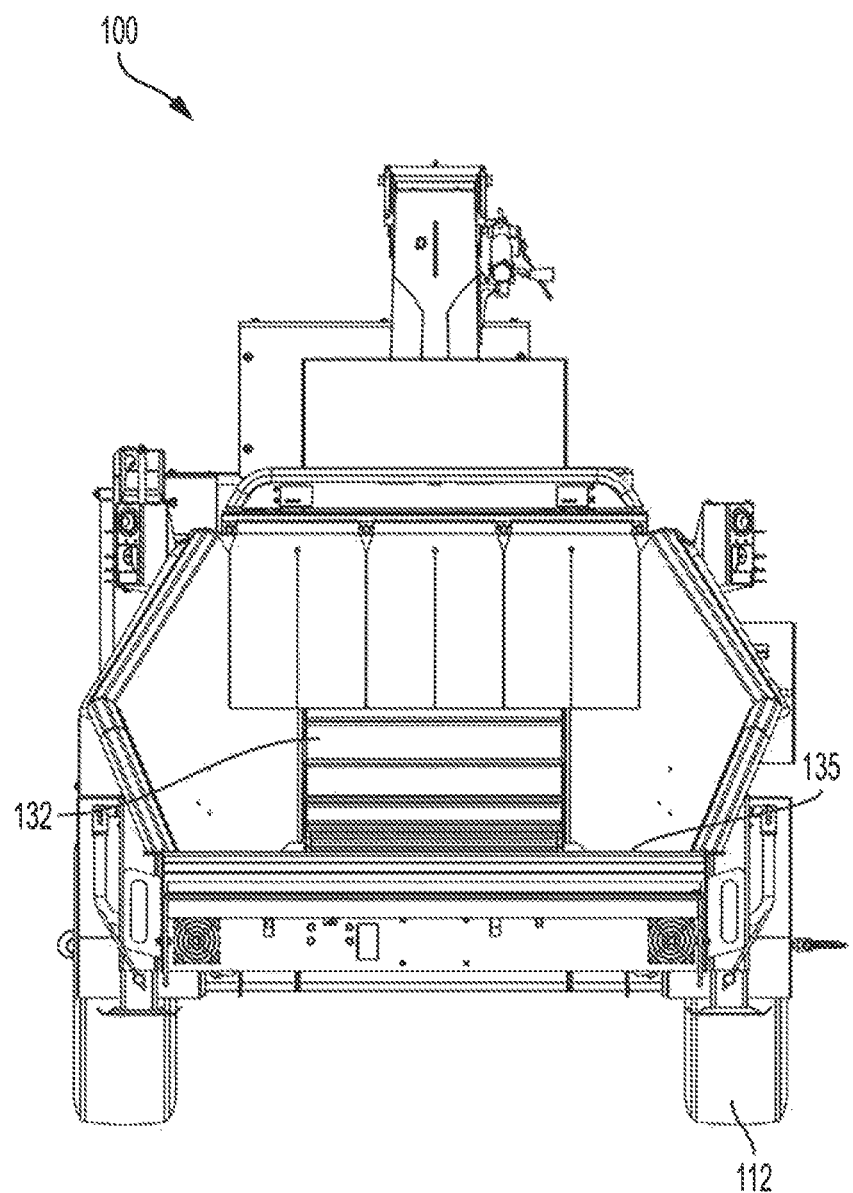
FIG. 3 is a rear view of the chipper of FIG. 1.

Before any embodiments of the present invention are explained in detail, it should be understood that the invention is not limited in its application to the details or construction and the arrangement of components as set forth in the following description or as illustrated in the drawings. The invention is capable of other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

DETAILED DESCRIPTION

FIGS. 1 through 6 illustrate a chipper 100, according to embodiments. The chipper 100 includes a reducing portion 120 for processing an item into smaller pieces, an infeed portion 130 for feeding the item to the reducing portion 120, and an engine 190 for powering the reducing portion 120 and the infeed portion 130. A frame 110 supports (and may optionally form part of) the reducing portion 120 and the infeed portion 130, and the frame 110 may further include wheels 112 and a hitch 114 to allow travel and transport of the chipper 100. Mobility may not be desirable in all cases, however, and stationary embodiments with or without wheels 112, hitch 114, and other aspects are clearly contemplated herein. It should be appreciated that although the figures herein show a chipper, similar concepts discussed herein may be used with a grinder.

The reducing portion 120 (FIG. 2) includes a cutting mechanism 122 such as a chipping or cutting drum or a disk cutter. Any appropriate cutting or comminuting mechanism (whether now known or later developed) may be used to process an item into smaller pieces.

The infeed portion 130 is upstream of the reducing portion 120 and includes at least one feed roller 132 (FIGS. 2-5B). Feed roller 132 may be associated with one or both of a rotary power system and a crushing system controlled via controller 170. The rotary power system may include a hydraulic motor 140 (FIGS. 5B and 6), that is operatively connected to the feed roller 132, and a control system 160 that selectively provides hydraulic fluid (not shown) to the motor 140 for selectively actuating (rotating) the feed roller 132 in one of three modes:

1) holding the feed roller from turning, effectively braking the feed roller; or 2) causing the feed roller to rotate in a clock-wise direction; or 3) causing the feed roller to rotate in a counter clock-wise direction(s).

Figure 6:
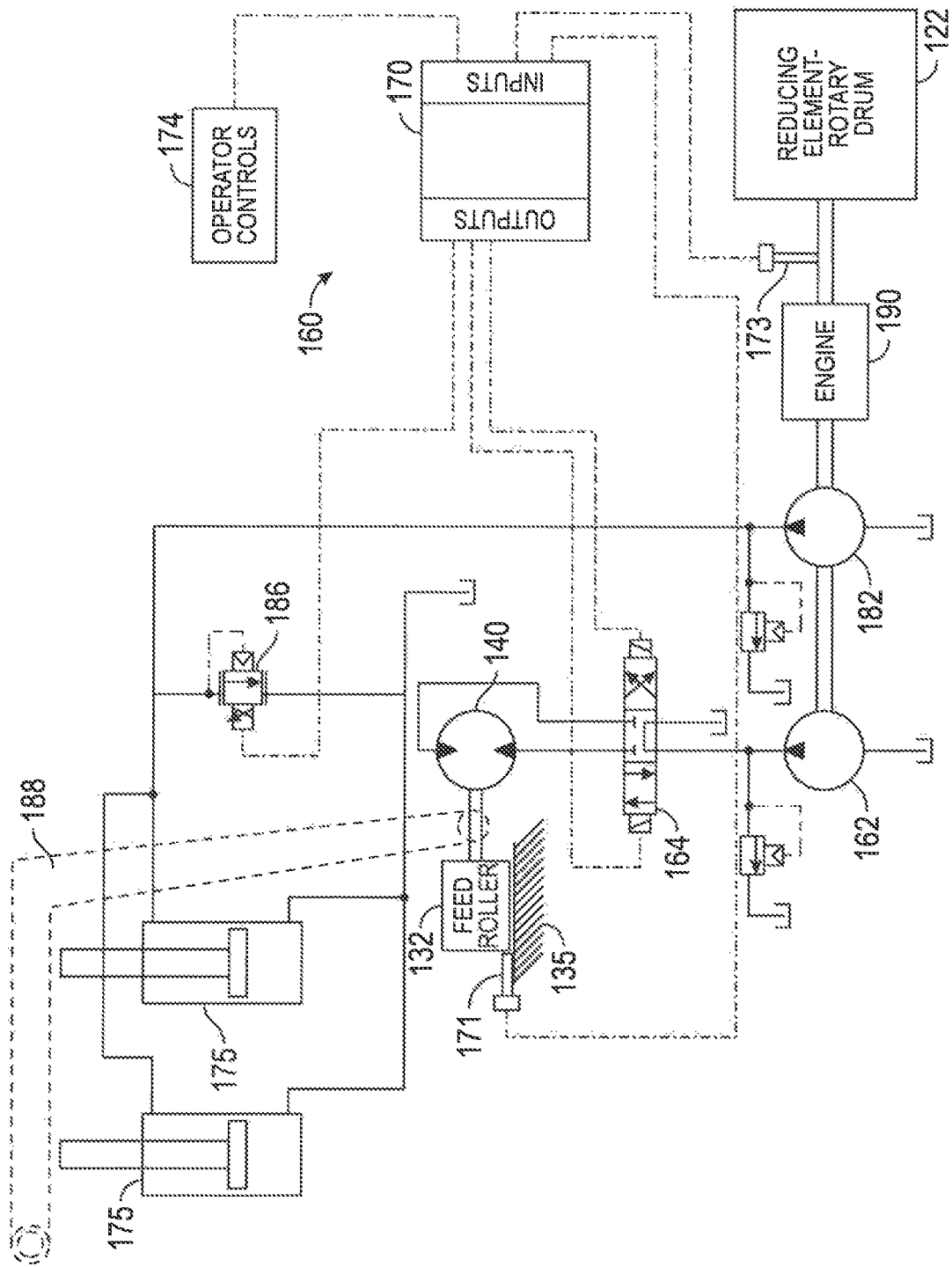
FIG. 6 is a schematic view of part of the infeed system from the chipper of FIG. 1.

More particularly, the control system 160, best shown in FIG. 6, includes a hydraulic pump 162 and a motor control valve 164. The pump 162 is powered by the engine 190 and provides hydraulic fluid to the motor 140, and the motor control valve 164 is positioned between the hydraulic pump 162 and the motor 140, such that fluid from the pump 162 passes through the motor control valve 164 before reaching the motor 140. The motor control valve 164 allows the hydraulic fluid to operate the motor 140 in a forward direction (e.g. when a forward solenoid is energized by an output of a controller 170) and in a reverse direction (e.g. when a reverse solenoid is energized by an output of the controller 170). The motor control valve 164 and/or another valve prevents the hydraulic fluid from operating the motor 140 and prevents hydraulic oil from being displaced by the motor to effectively brake the motor (e.g., when neither solenoids are energized). It may be particularly desirable for the motor 140 to be a fixed displacement motor, and for the pump 162 to be a fixed displacement pump, as fixed displacement motors and pumps may be cost effective. In embodiments, it may be acceptable to operate the feed roller 132 at a constant speed, and may be desirable for producing a consistent chip output from the chipper 100. In some cases a variable displacement pump or a variable displacement motor could be utilized, and are within the scope of the current embodiments.

Controller 170 is a device that interfaces with another device to control that peripheral device. Controller 170 may be a microcontroller with one or more processor cores along with firmware stored on volatile and/or nonvolatile memory such as program memory and/or RAM. The controller 170 may be in the control system 160 as one of many controllers 170. As illustrated in FIG. 6 the control system has a single controller (but may include multiple controllers) with several inputs and several outputs. The controller 170 is operatively connected to the motor control valve 164 to control the flow of hydraulic fluid from the pump 162 to the motor 140. The control options include direction control, where the motor control valve 164 can cause the motor 140 to rotate in either direction (e.g., via the two positions that result from when a forward solenoid is energized or when a reverse solenoid is energized) and flow control, where the motor control valve 164 is in the center position (e.g., when neither solenoids are energized), to prevent the hydraulic fluid from operating the motor 140. The control valve 164 may prevent and/or limit hydraulic fluid flow without departing from the scope hereof The schematic shown in FIG. 6 depicts pump 162 as a fixed displacement pump with a simplified open center circuit. A closed center system with a variable displacement pump could be utilized, and is within the scope of the embodiments herein.

Controller 170 may control additional elements of embodiments herein, such as pumps 162, 182 or the engine 190 that powers the pumps 162, 182. Those skilled in the art will appreciate that a variable displacement pump could be utilized wherein the controller 170 could be operatively connected to the pump 162 to control the speed and direction of rotation of motor 140. Those skilled in the art will appreciate that additional motors (not shown) may further be utilized. For example, U.S. patent application Ser. No. 15/145,653 to Vermeer, which is incorporated by reference herein, and forms part of this detailed description, discloses two motors operating a feed roller in series and in parallel to adjust torque and speed of the feed roller. In certain embodiments herein, the control system 160 described herein uses the status of the location and rotation of the feed roller 132 as a factor that affects the control of the crush force (or "down pressure," when used in the illustrated feed configuration wherein the axis of the feed roller 132 is horizontal; for other feed configurations such as those where the axis of the feed roller 132 is vertical, the described embodiments can also be applied to control the crush force) applied by the feed roller 132. The controller 170 is programmable and has the ability to process data as needed, including data indicative of whether the feed roller 132 is rotating in a first direction.

The crushing system associated with the feed roller 132 may control the amount of crush force imposed on a material by the feed roller 132. In embodiments of the crushing system, the infeed portion 130 may further include a surface 135 (e.g., an infeed floor) opposite the feed roller 132. Surface 135 may additionally or alternatively be an additional feed roller without departing from the scope hereof Moreover, although feed roller 132 and surface 135 are shown above/below each other (e.g. such that the feed roller 132 is horizontal), they may also be in a vertical configuration where the feed roller 132 axis is substantially vertical. The feed roller 132 is movable toward and away from surface 135. In embodiments, feed roller 132 moves toward surface 135 as cylinders 175 are retracted and away from the opposed surface 135 as cylinders 175 are extended. Output from a sensor 171 indicates an operational parameter of the feed roller 132, such as its position relative to surface 135. Other operational parameters of the feed roller could also be measured by additional sensors. In embodiments other operational parameters of the feed roller 132 are determined by the control logic that is embedded in the controller 170, e.g. whether the feed roller 132 is rotating to move the item towards the reducing portion is determined by monitoring whether the forward feed solenoid is energized. The term "operational parameter" as used herein, may, in embodiments, include information about how the chipper is interacting with the material. For example, sensor 171 is, in embodiments, be configured to monitor the effectiveness of movement of the material by the chipper. Sensor 171 could be an optical sensor (such as an image sensor, an IR sensor, a PIR sensor, a laser, etc.) that monitors interaction between the feed roller and the material to determine if material is being effectively moved toward the feed roller, or that monitors whether material is being discharged by the chipper or grinder.

The crushing system may include pump 182, powered by the engine 190 (FIG. 6) as shown or by a separate engine (not shown), to provide hydraulic fluid to the hydraulic cylinders 175. It is foreseen that pump 162 could be used in lieu of pump 182 in some embodiments or that more pumps (not shown) may be necessary to control the crush force of the feed roller 132. Cylinder control valve 186 is shown operatively connected to the controller 170, so that the controller 170 can control the hydraulic fluid applied to the cylinders 175 by means of pressure reducing/relief valve 186 that controls the level of the pressure applied to bias the cylinders 175 as they are retracted. Valve 186 includes a pulse-width modulated (PWM) solenoid that the controller 170 may drive with a fluctuating electrical signal. The pressure applied to the rod-end of the cylinders, that tends to bias them to retract, may be proportional to the current supplied to the PWM solenoid, in embodiments. This current is typically measured in milliamps (mA).

The valve 186 is able to control the fluid pressure to cylinders 175. Pump 182 will cause fluid to flow to the rod-end of the cylinders 175, creating a pressure bias to retract. In the preferred embodiment illustrated pressure applied to the rod-ends of cylinders 175 creates a retraction force which will be applied to the pivotal frame 188 holding the feed roller 132 about a pivot moment, causing the feed roller 132 to be biased towards the surface 135. The crush force applied by the feed roller 132 to the item 10 is the result of this pressure that is biasing the cylinders 175 to retract. The level of that pressure is controlled by valve 186, which may be controlled such that there is a minimum pressure applied while feed rollers 132 are applying a crush force. Valve 186 is a pressure reducing/relieving valve which functions to not only control the level of pressure generated by the pump, but also to control the level of pressure that can be generated by the cylinders 175. As the feed roller 132 is powered to rotate, when the feed roller 132 encounters an item with varying dimensions, the feed roller 132 will move up or down. In order for the feed roller 132 to move up, oil has to be displaced from the rod-end of the cylinders 175. Valve 186 functions to control the level of pressure generated in this way by the cylinders 175 by allowing oil to escape to tank, and in this way the valve 186 allows the feed roller 132 to move in either direction with approximately the same biasing force, or crush force.

Additional valves (not shown) may be added to lift the feed roller 132 when necessary, such as in the event an operator needs to raise the feed roller 132 for maintenance. One of ordinary skill in the art will appreciate that many of the various electrical and mechanical parts discussed herein can be combined together or further separated apart. As a further example, the controller 170 may be separated into a plurality of discrete controllers which jointly perform the processes and functions described herein, and which jointly form the controller 170. It is foreseen that the controller 170 could drive the pump 182. It is also foreseen in a separate embodiment that a separate pump (not shown) could provide pressure to the opposite side of the cylinders 175 to lift the feed roller 132.

Still referring to FIG. 6, various operator controls 174 may additionally be in data communication with the controller 170. The operator controls 174 may, for example, be levers, switches, dials, buttons, or any other appropriate controls, whether now existing or later developed. In some embodiments, at least one of the operator controls 174 is not in direct physical communication with the controller 170, and instead communicates with the controller 170 wirelessly, such as through one or more of near-field, far-field, radio, or cellular communication technology.

When chipping items such as trees and branches, it can be important for the feed roller 132 to apply rotational infeed force combined with a sufficient crush force on the tree or branch such that the tree or branch is moved toward the reducing portion 120. Biasing the feed roller 132 toward the opposed surface 135 is expected to increase the amount of crush force applied, while reducing the bias of feed roller 132 from the opposed surface 135 is expected to decrease the crush force.

The controller 170 may utilize various information, programming, and logic to adjust the pressure applied to the cylinder that positions the feed roller in order to control the crush force through the crush optimization mode newly disclosed herein, or may operate under multiple modes. For example, one mode may be the crush optimization mode, and a second mode may be the mode disclosed in U.S. patent application Ser. No. 15/145,653 to Vermeer Manufacturing Company, whereby a maximum crush force is applied when the operator selects an aggressive feed mode that may involve a manual override feature, allowing a maximum crush force to be applied which may be activated via a button, switch, lever, or other mechanical or electrical signal generated at the chipper 100 or sent wirelessly via a remote control coupled to controller 170, that simultaneously reduces the rotational speed of the feed rollers and increases the torque applied to rotate the feed rollers. A third mode may move and maintain the feed roller 132 a maximum distance from the opposed surface 135, such as to provide access to the reducing portion 120 for cleaning. A fourth mode may involve a manual override feature, allowing, for example, more or less crush force to be applied which may be activated via a button, switch, lever, or other mechanical or electrical signal generated at the chipper 100 or sent wirelessly via a remote control coupled to controller 170. If multiple modes are available, the particular mode may be selected using the operator control 174.

Figure 7A:
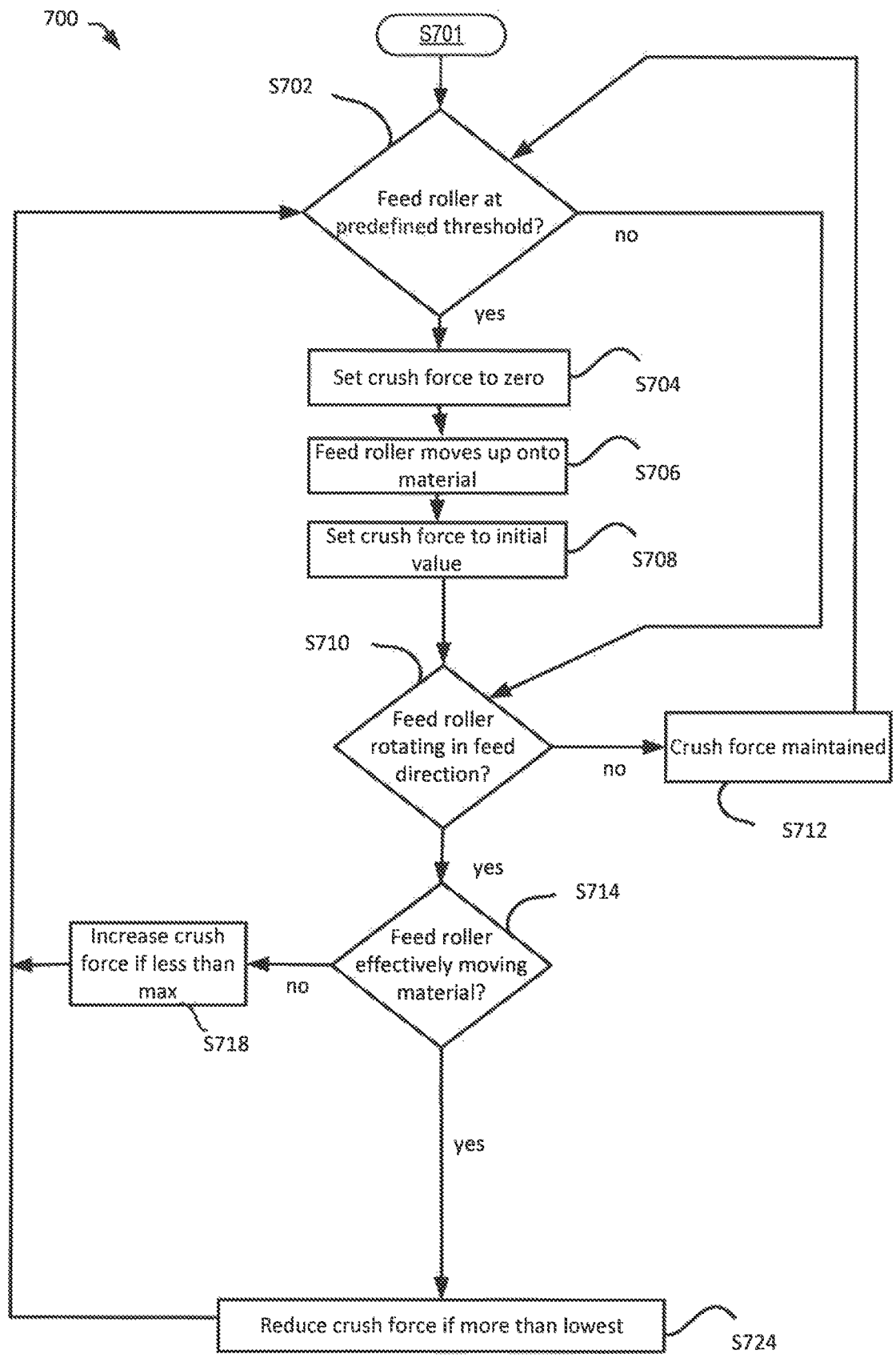
FIG. 7a shows example logic used by the controller in the chipper of FIG. 1.
Figure 7B:
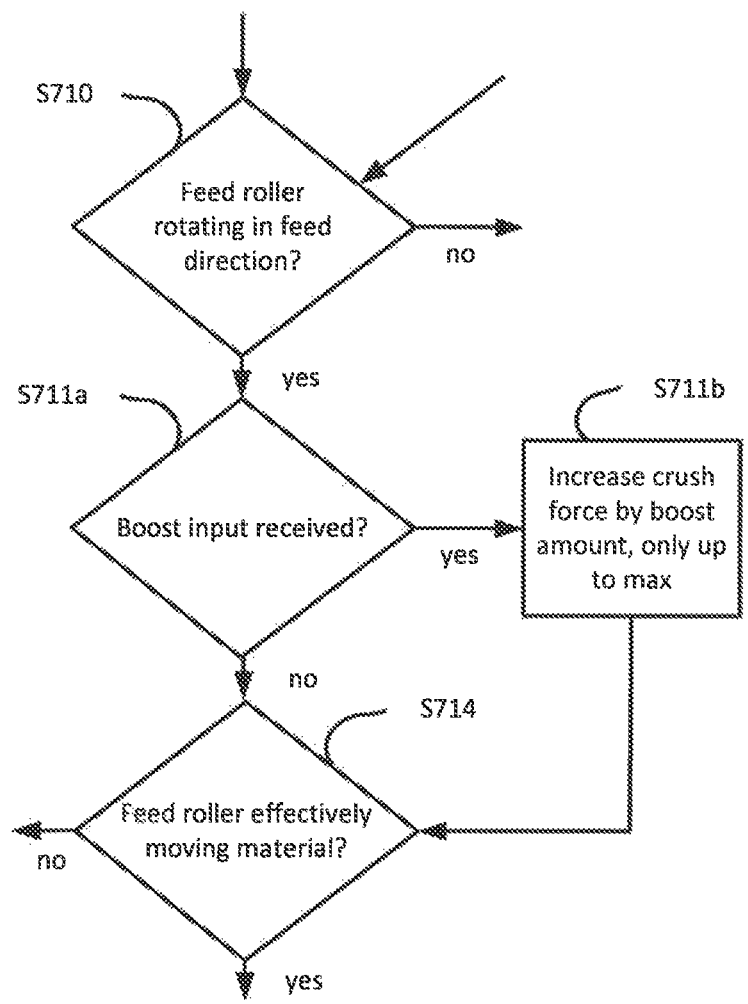
FIG. 7b shows additional example logic used by the controller in the chipper of FIG. 1.

FIGS. 7A-B show example logic used by the controller 170 when in the crush optimization mode, with process 700 starting at step S701, for example when the operator activates a start control. The rotary power system described above may be started when the operator activates the start control. In one example of step S701, the controller 170 causes the feed roller 132 to rotate in a direction to feed material towards the reducing portion by energizing the forward solenoid of motor control valve 164. At step S702, the controller 170 uses position information from the sensor system 171 to determine if the feed roller 132 is located at, or below, a predefined threshold position with respect to surface 135. For example, in embodiments, controller 170 may monitor the position information to determine if feed roller 132 is at the predefined threshold position when the feed roller 132 is at an innermost position (i.e., the location closest to the opposed surface 135 which the feed roller 132 is allowed to reach). In embodiments, controller 170 may monitor the position information to determine if feed roller 132 is at, below, or at or below, a predetermined position from surface 135 that is farther than the inner most position, but closer than an outermost position. The feed roller 132 may be biased toward the predefined threshold position, for example by gravity, springs, hydraulic force, etc. The feed roller will not be at or below the predefined threshold if the feed roller is already lifted-up and setting on an item. In that case, when not at the predefined threshold, the process moves to step S710. Otherwise, the process continues to step S704, whenever at or below the predefined threshold position the crush force is set to zero. In the embodiment described by FIG. 6 at this step the controller 170 will set the pressure relief valve 186 to zero, or a minimum value, which will allow the feed roller 132 to move freely.

At step S704, the controller 170 sets the crush force applied by the cylinders 175 to zero or a minimal crush value until the feed roller 132 moves past the predefined threshold onto the item 10 (e.g., log or branches) as it is being fed toward the reducing portion at step S706. At step S704, in embodiments, the chipper or grinder may be in a waiting configuration waiting for the operator to feed material 10 into the chipper. During such waiting configuration, the feed roller 132 may be rotating forward such that as the operator feeds material 10 into the chipper or grinder, the feed roller 132 is ready to feed the material toward the reducing portion 120. The controller 170 may then apply an initial crush force to item 10 by the feed roller 132 (e.g., by setting the current to the PWM solenoid of valve 185 to a predetermined initial value to generate the desired initial crush force) via the cylinders 175 at step S708, and the process may proceed to step S710.

At step S710, the controller 170 assesses the status of the rotary power system. Controller 170 automatically modifies the performance of the rotary power system, in an Auto-Feed function as described in U.S. Pat. No. 7,011,258 (which is hereby incorporated by reference) and as a result at times the feed roller 132 may not be rotating in a feed direction. During operation of a chipper it is not uncommon that the control system alternates the rotation of the feed rollers between periods of time when the feed roller is operating in a feed direction, followed by periods of time when the feed roller is not operating in a feed direction, to allow the engine controlling the reducing portion to accelerate to an acceptable speed. It should be appreciated that said "periods of time" may vary depending on the conditions of the chipper, the material, and other variables. In a preferred embodiment the status of the rotary power system is inferred by assessing the status of the controller 170, either by evaluation of the control logic, or by assessment of the related outputs. In alternative embodiments additional sensors could be added to determine whether the feed roller 132 is rotating, and in which direction the feed roller 132 is rotating.

If the feed rollers are not rotating in a feed direction, as may occur due to the Auto-Feed function, or as may occur if the operator has activated an Operator Control to stop feeding material, the previous crush force is maintained at step S712, and the process returns to step S702. As long as the feed roller is still above the threshold, the logic returns to step S710, maintains the current crush force until the feed roller 132 is detected as rotating in the feed direction, permitting the process to move to step S714. Feed rollers may be not be rotating in a feed direction for a variety of reasons, including but not limited to, jam-reversal, neutral upper feed control bar (UFCB) position, and auto-feed droop cycling.

At step S714, the controller 170 uses information from a sensor 173 illustrated in FIG. 6, that measures the speed of rotation of the engine 190, or of the reducing element 122 that is operatively coupled to the engine, to determine, directly or indirectly, whether the feed roller 132 is effectively moving the material toward the reducing portion 120. As used herein "effectively moved" corresponds to a situation where the material is being moved as expected within the chipper or grinder. For example, material is effectively moved when the speed measured by sensor 173 indicates a routine or expected operation of the reducing portion 120 when reducing material 10. In another example, material may be deemed to be effectively moved when images from sensor 171, such as an optical sensor, indicate that the feed roller is properly engaging the material. In another example, material may be deemed to be effectively moved based on images from sensor 171, such as an optical sensor, indicating (with or without imaging the feed roller 132 engaging the material 10) that material within an inlet area of the chipper or grinder is moving towards the reducing portion 120. In another example, material may be deemed to be effectively moved when the material is sensed by a sensor as being discharged from the chipper or grinder. As another example, when the engine 190 is a typical diesel or gasoline engine the expected operation of a reducing portion will include a reduction of engine speed from a high-idle state. As another example, if an engine operates at a high idle of 2400 RPM, in an unloaded condition, and if the engine RPM is measured to be 2400 RPM by sensor 173, the logic at step S714 will conclude that the feed roller is not effectively moving the material to the reducing element. If the engine RPM is measured to be less than 2400 RPM, the logic at step S714 will conclude that the feed roller is effectively moving material to the reducing element. Other sensor systems may monitor one or more of the following operating conditions that would be capable of providing an indication that the material is being effectively moved to the reducing element including, but not limited to: engine load; engine torque; fuel consumption; rotational speed of the reducing portion 120 (e.g. cutting mechanism); speed or load of the drive system, vibration of the feed roller 132, the cutting mechanism, or a shear bar; the presence of chipped material in a discharge chute; image assessment from a digital image device showing movement of the material being engaged with the feed roller; or some combination of such factors. If an electric motor was used instead of the diesel engine 190, then a sensor measuring motor amperage could be used to determine whether the feed roller is effectively moving material. If not determined to be effectively moving material, the controller 170 proceeds to step S718.

At step S718, controller 170 increases the crush force applied by the cylinders 175 unless the crush force is already at a maximum setting. In certain embodiments, the process for increasing the crush force of step S718 within method 700 may involve step-function increases where the crush force is increased in steps by making incremental increases in the current applied to the PWM solenoid of valve 186. For instance, in one example the current applied to the PWM solenoid is increased by 10 to 50 mA at step S718. The logic will then cycle back and if the feed roller is still above the threshold at step S702, and still rotating in the feed direction at step S710 it will come back to the evaluation at step S714. The frequency at which the logic makes the Step S714 evaluation can be determined by the control system capabilities, to be as frequent as possible, or it can be set to a predetermined frequency, or it could be variable. If the frequency is variable, it could be determined by an operating parameter: for instance if the engine speed is decelerating quickly, within a first range, it may be advantageous to make the step S714 evaluations at a fast rate, while if the engine is decelerating slowly, within a second range, it may be advantageous to make the step S714 evaluations at a slower rate.

Likewise, the level of increase of the step-function may be variable, or may be fixed at a predetermined value. In some embodiments the second and additional iterations of step S718 are at second increase levels that are less than, or more than the first increase level.

If the controller 170 determines at step S714 that the feed roller 132 is effectively moving material, the controller 170 decreases the crush force applied by the cylinders 175 at step S724, unless the crush force is already at the lowest setting. The process for decreasing the crush force may involve step-function decreases where the crush force is decreased in steps by making incremental decreases in the current applied to the PWM solenoid of valve 185. For instance, in one example the current applied to the PWM solenoid is decreased by 5 to 25 mA at step S724, and if the feed roller is still above the threshold at step S702, and still rotating in the feed direction at step S710, the logic will come back the evaluation at step S714. The frequency at which the logic makes the Step S714 evaluation can the same for the process of decreasing the crush force as was described for the process of increasing the crush force including the options of a maximum frequency, as fast as possible or a fixed, predetermined frequency or a variable frequency. The level of decrease can be fixed or variable, as is described for the step-function increase.

Figure 7C:
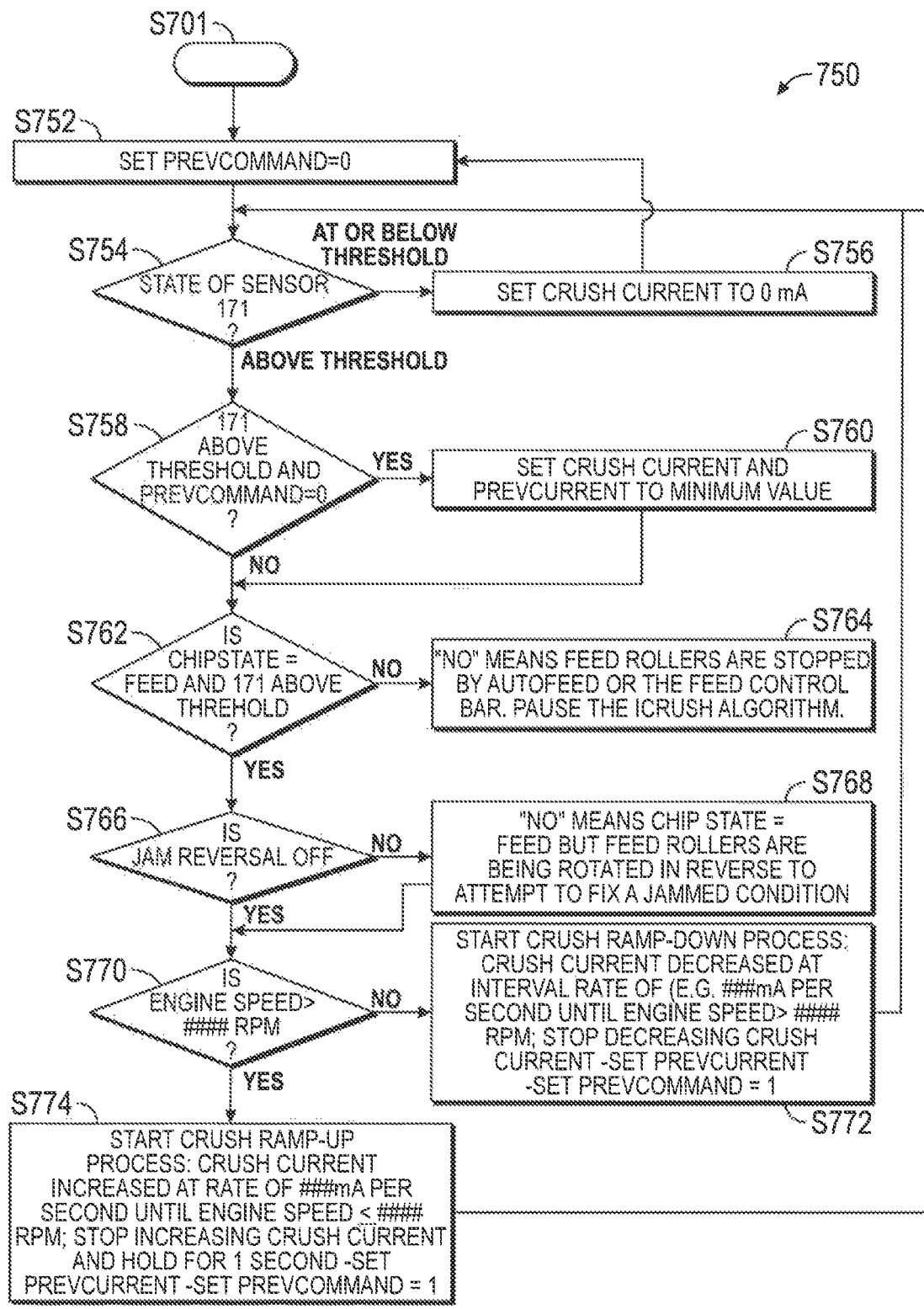
FIG. 7c depicts a process, which is an additional embodiment of control logic implemented by the controller in the chipper of FIG. 1.

FIG. 7C depicts process 750, which is an additional embodiment of control logic implemented by controller 170. Process 750 starts at step S701, like method 700. At step S752, the controller 170 sets a previous command state to zero (e.g. resets to initiate process 750, and/or indicates the crush force is zero). Controller 170 then, at step S754, determines the state of sensor 171. For example, the controller 170 may determine if the feed roller 132 is at or below a predefined threshold position, as discussed above. If at or below the predefined threshold position, process 750 proceeds to step S756, else, process 750 proceeds to step S758.

At step S756, the controller 170 sets the crush current to zero, to control valve 185 such that the crush force applied by the cylinders 175 is set to zero (or a minimal value). At step S758, the controller 170 determines if the previous command state is set at zero (e.g., this is the first instance of applying a crush force in the current iteration of the process 750). If the previous command state is set to zero, and the feed roller 132 is above the predetermined threshold position, then process 750 proceeds to step S760. Else, process 750 proceeds to step S762.

At step S760, the controller 170 sets the crush current to a minimum threshold current (e.g. 200 mA) to control valve 185 such that the crush force applied by the cylinders 175 is set to a minimum threshold crush force amount, and sets a previous current value in memory to 200 mA. Process 750 then proceeds to step S762.

As step S762, the controller 170 monitors a chipstate value. If the chipstate value, which is a signal from the chipper auto-feed control indicating whether the feed roller is in a "feed" state, is in feed state and the position from sensor 171 is above the predetermined threshold position, then process 750 proceeds to step S766, else process 750 proceeds to step S764.

At step S764, the controller 170 pauses process 750 until the chipstate returns to "feed" value.

At step S766, the controller 170 determines if the jam reversal state is off If the jam reversal state, which is a value indicated by the auto-feed algorithm is still in chipstate=feed state but the feed roller 132 is being reversed to attempt to fix a jam situation, is off, then process 750 proceeds to step S768. Else process 750 proceeds to step S770.

At step S768, the controller 170 maintains a crush force current to maintain the crush force applied by the cylinders 175.

At step S770, the process 750 monitors an engine speed of reducing portion 120 to determine if it is above an engine speed threshold (e.g. 2150 RPM). If yes, process 750 proceeds to step S774, else process 750 proceeds to step S772.

At step S772, the controller 170 proceeds with a crush ramp-down process. To implement the crush ramp-down process, the controller 170 decreases the crush current at a rate of 100 mA per second (or another arbitrary value) until the engine speed is above the engine speed threshold. Each iteration of step S772, the controller 170 updates in memory a previous current value to indicate the most recent crush current, and the previous command value to 1. After completion of step S772, process 750 proceeds to step S754.

At step S774, the controller 170 proceeds with a crush ramp-up process. To implement the crush ramp-up process, the controller 170 increases the crush current at a rate of 100 mA per second (or another arbitrary value) until the engine speed is at or below the engine speed threshold. Each iteration of step S774, the controller 170 updates in memory a previous current value to indicate the most recent crush current, and the previous command value to 1. After completion of step S772, process 750 proceeds to step S754. Step S774 may be implemented until the crush current is set to a maximum setting, which may be determined, for example, by the pressure limits of the cylinders 175, and the lowest setting may be determined, for example, by the pressure required to generate the lowest crush force known to be effective.

In some embodiments, the user may provide the controller 170 instructions to increase the crush force (e.g., through the controls 174). This manual boost process may hasten the feed roller 132 arriving at the appropriate crush force. FIG. 7B shows example signal data generated when in the crush optimization mode with this manual boost option. The process in FIG. 7b is generally the same as the process 700 of FIG. 7a, but with steps S711a and S711b added. As such, not all steps from FIG. 7a are reproduced in FIG. 7b.

At step S711a, the controller 170 determines whether the controls 174 have input a boost signal. If not, the controller 170 proceeds to step S714. If a boost signal (V) is detected at step S711a, the controller 170 moves to step S711b before continuing to step S714. At step S711b, the controller 170 increases the crush force applied by the cylinders 175 by a set amount, but only up to the maximum crush force.

By utilizing the process 700 and/or process 750, the amount of crush force provided by the feed roller 132 can be appropriately and automatically minimized while at the same time ensuring infeed operation. Processes 700 and 750, in embodiments, operate in conjunction with an auto-feed process, for example, by evaluating and optimizing the crush force(s) when the feed roller 132 is feeding material 10 toward the reducing portion. During certain auto-feed processes, the auto-feed cycle may stop the feed roller 132 from rotating in the feed direction, or reverse the feed roller 132 rotation. As such, the processes 700 and 750 may compensate for when the auto-feed cycle is in a feed roller reverse or feed roller stopped state, thereby optimizing the control of the feed roller crush force. In addition, there are several related advantages. One advantage is increasing engine power available for the reducing portion, and thus increasing potential material processing productivity by the system.

The hydraulic circuit that provides pressure that biases the cylinders 175 requires power that is proportional to the flow rate of the hydraulic pump and the crush pressure. By reducing the crush pressure, there is a corresponding reduction of parasitic loss. This reduction of parasitic loss of engine power may allow chipper 100 to utilize a lower horsepower engine or to reduce the rate that fuel is consumed. The increased feeding performance increases production rates and reduces the run time of the engine resulting in an improved efficiency of the system. With the previous systems, as described in U.S. Pat. No. 8,684,291 predetermined pressure curves were described, as providing an appropriate level of downward or crush force. During the development of the current invention the relationship between pull-in force and crush force was measured.

Figure 8:
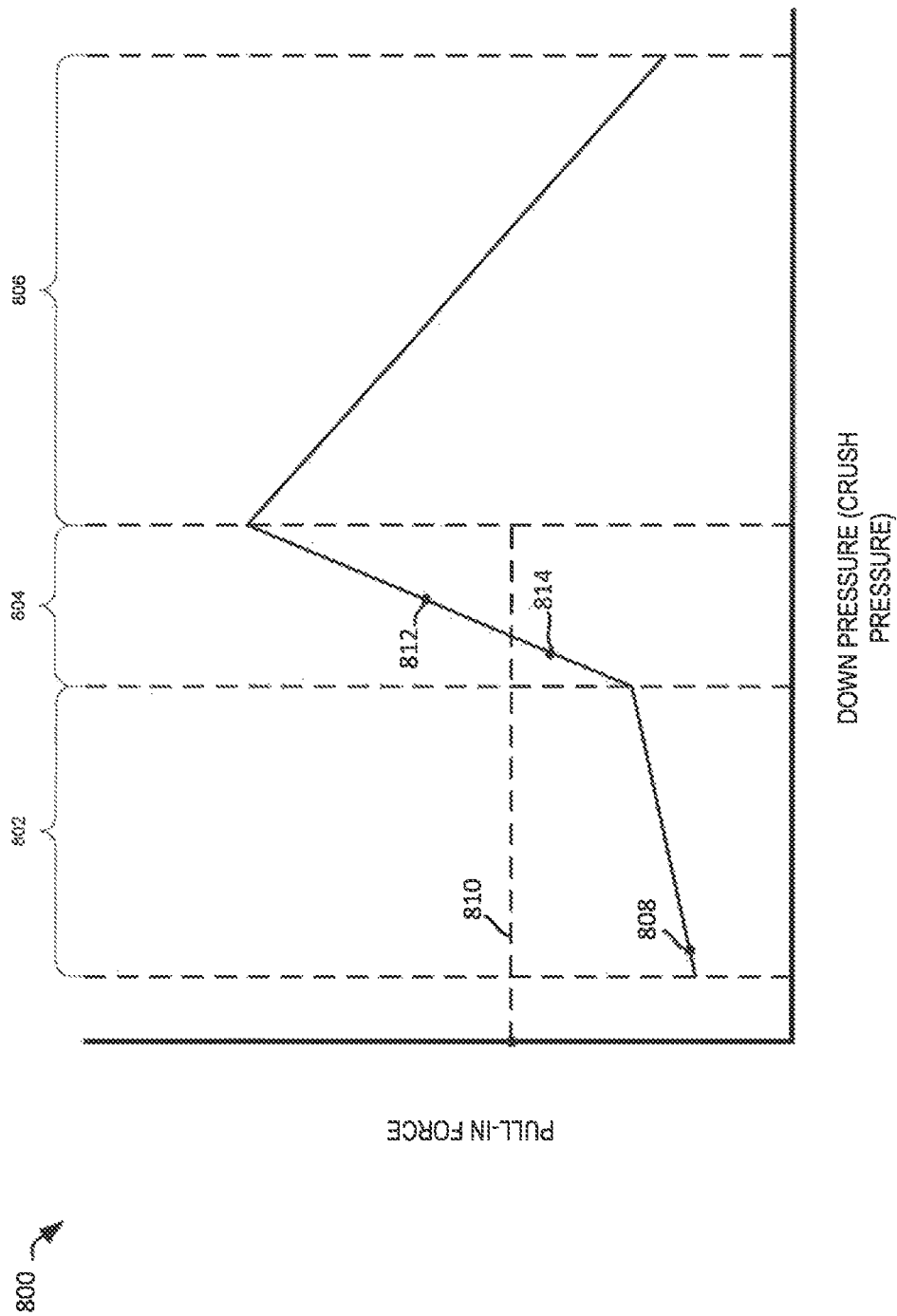
FIG. 8 depicts an example diagram 800 showing the effects of the crush force (X-axis) on the pull-in force of the material towards the reducing portion.

FIG. 8 depicts an example diagram 800 showing the effects of the crush force (X-axis) on the pull-in force of the material towards the reducing portion. Example diagrams similar to diagram 800 were generated by attaching a piece of material (i.e. wood log) to a force sensor, and then feeding the log into the chipper with predetermined amounts of feed roller crush force to determine the amount of pull-in force generated on the log at each predetermined crush force. Diagram 800 is exemplary because the actual values within diagram 800 may vary based on a number of variables, including but not limited to: type of material, size of material, condition of the material, etc. Diagram 800 shows three regions in the curve.

Region 802 indicates when the crush force is low and where the feed roller 132 may not adequately "bite" into the material. As such, there is only minor increase in pull-in force with increase in crush force.

Region 804 shows that, as the feed roller 132 starts to engage (or "bite") the material, there is a rapid increase in pull-in force. Region 804 indicates an optimal range based on characteristics of the chipper (e.g. size, engine horsepower, drum RPM, etc.).

Region 806 shows that, when the pressure is above an optimal range, the pull-in force decreases as pressure increases due to friction between the material 10 and one or both of the feed roller 132 and the surface 135.

Process 700 and 750 operate to maintain the crush force within region 804. As discussed above, process 700 and 750 will increase down force if the material is not feeding, such as when the resulting pull-in force is not adequate to feed the material. In one example there is a minimum effective pull-in force illustrated as 810 in FIG. 8. Process 700 and 750 may include an initial crush force at point 808 (e.g. steps S708, S760). That would not generate enough pull-in force and the method would result in an automatic increase of the crush pressure. In one example the system dynamics could result in having the crush pressure increase to point 812 before the system determines that the feed roller is effectively moving material, at step S714. Once that occurs the method will subsequently automatically reduce the crush force until the system determines that the feed roller is no longer effectively moving material. In the example depicted in FIG. 8, the system dynamics could result in the crush pressure being reduced to point 814, below the minimum effective pull-in force, before the system can determine that the feed roller is no longer effectively feeding material. Once that determination is made, the method will then automatically increase the crush pressure, and the system will continually vary the pressure, in an increasing manner, and then a decreasing manner above and below the minimum effective pull-in force.

In some cases the minimum effective pull-in force is less than the pull-in force generated by the initial crush pressure at point 808. In that situation the method would hold the pressure at this minimum point. During development of the current invention the minimum allowed crush pressure was initially set at a point higher than was necessary. By utilizing the method 700, it was discovered that it is possible to operate a chipper at minimum crush pressures lower than was previously felt possible.

This system helps avoid generating a crush force level that effectively goes beyond aiding material traction to a point of serving as a braking force against material IO as it is conveyed through the infeed portion 130. In some materials, with the previously predetermined levels of crush pressure, those predetermined values were believed to be in zone 806. This was a result of setting the predetermined levels so that they are high enough to generate the minimum effective pull-in force for all materials.

These two cases illustrate how the method is capable of reducing the parasitic load on the engine: 1) by constantly evaluating the crush pressure to automatically find the minimum effective pull-in force and 2) by allowing a minimum crush pressure that is lower than previously thought possible.

Another advantage of the current invention is the ability to require less user input compared to conventional systems. For example, during tests using the above described process, a comparison was made with a machine operated with the crush optimization mode, and the same machine without the crush optimization mode. When operated without the crush optimization mode the crush force control is as described in U.S. Pat. No. 8,684,291 with a control system applies a predetermined and constant downward force during normal operation and a manual control that the operator can use to override the control system to apply more down pressure. When operated without the crush optimization mode branches would get hooked on the infeed system and stop the material from moving. The operator would then use the manual control to apply more down pressure to force the material to feed-in. When operated with the crush optimization mode, there were similar instance where branches would get hooked on the infeed system and stop the material from moving. With the crush optimization mode the operator still has a manual control to apply a maximum crush pressure. However, process 700 and 750 allows the control system to automatically increase the crush force, in conjunction with providing auto-feed control, and it was noted by an experienced user that the operator's use of the manual control (e.g. using a button or manual lever) was reduced 75 to 80 percent. In other words, the operator could spend more time feeding material into the chipper as opposed to stopping the feeding process and manually crushing material currently being fed into the chipper.

As an additional benefit, when the process 700 or 750 results in operating at lower crush force than conventional systems, there may be a reduction of heat generation within the hydraulic circuit; this may increase the overall efficiency of the chipper 100. Further, this system helps avoid generating a crush force level that effectively goes beyond aiding material traction to a point of serving as a braking force for conveyance through the infeed portion 130.

Chippers including a reducing mechanism 120 in the form of a cutting drum operate by rotating the cutting drum at very high RPM, and then feeding the material to the drum. As the material is being reduced by the cutting drum, the drum's RPM rapidly decreases. If the RPM of the cutting drum is below a certain threshold, the cutting drum either cannot reduce the material, or cannot effectively reduce the material. As such, optimized operation of infeed to the reducing mechanism 120 is achieved desired. Using the above described processes to control of the material 10 towards/away from the reducing portion by controlling feed roller 132 may be optimized by controlling rotational direction of the feed roller 132, but also by the reducing portion 120 need to be optimized, but also the ability of the feed roller 132 to grip the material 10 is very important.

Figure 9A:
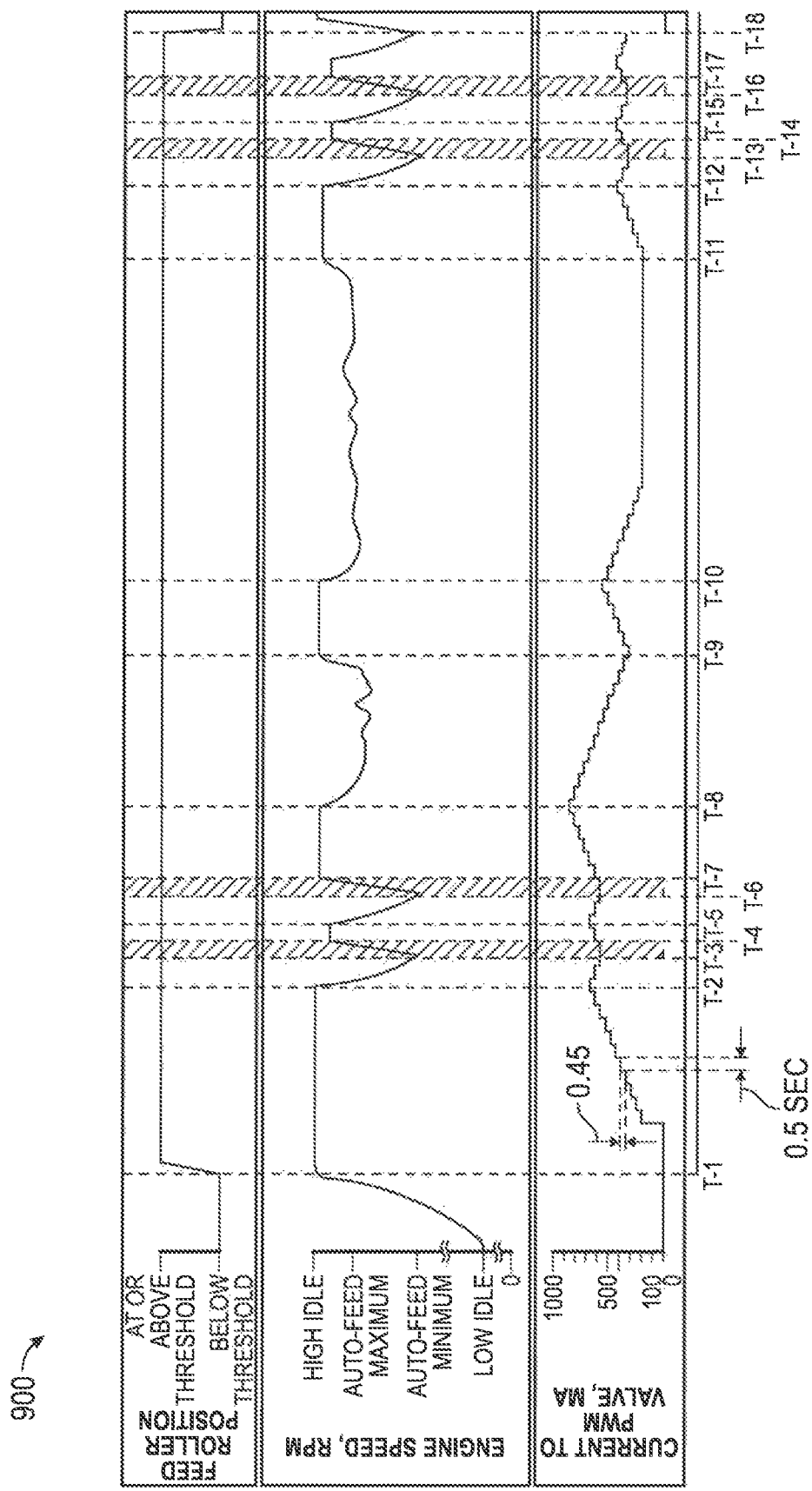
FIG. 9a shows example data from the chipper of FIG. 1.
Figure 9B:
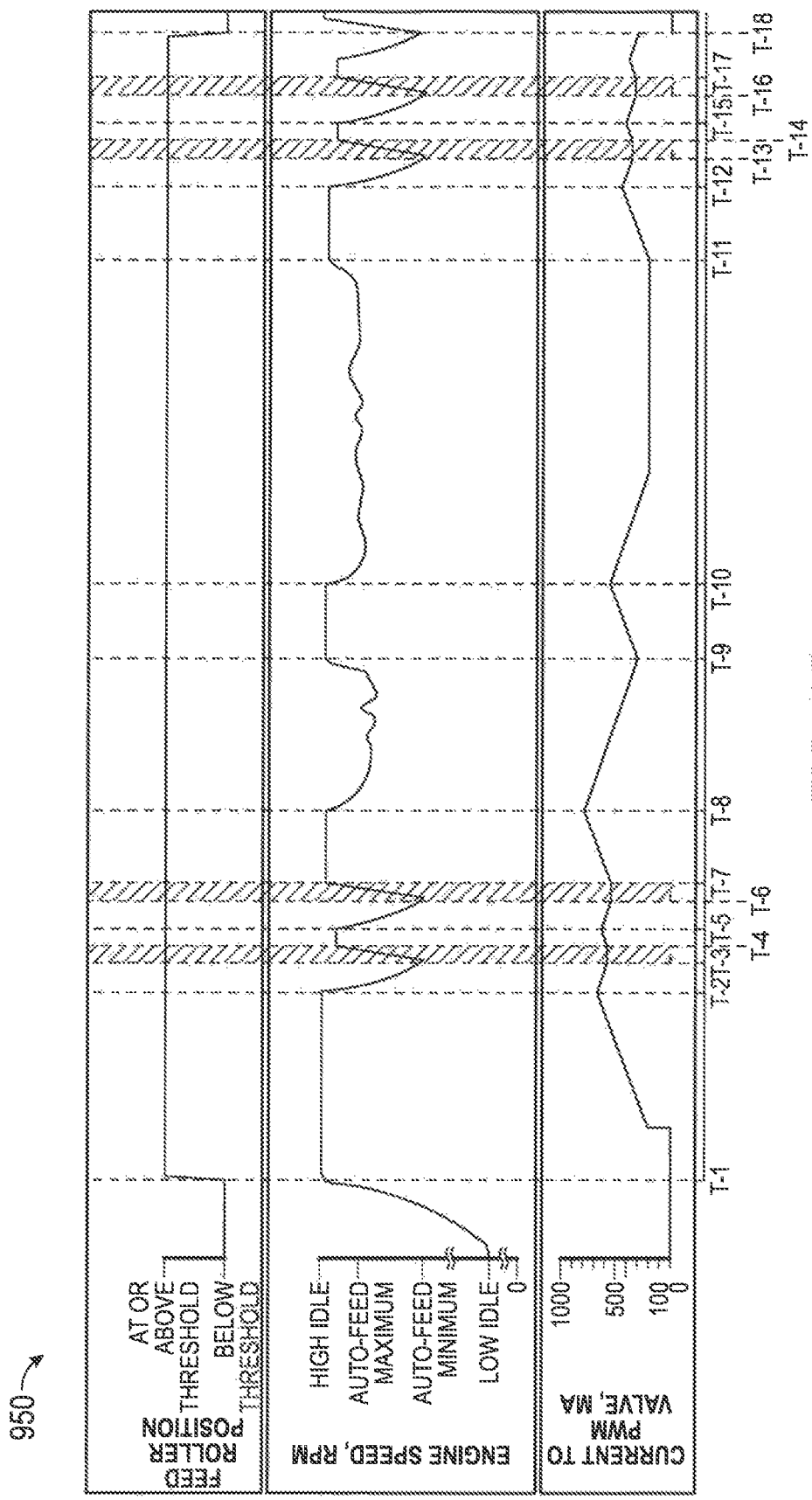
FIG. 9b shows example data from the chipper of FIG. 1.

FIGS. 9A, 9B depict example signal diagrams 900, 950 illustrating results of processes 700, 750, in embodiments. Diagrams depict signal plots for the current to the PWM valve 185 (mA), the engine speed of the reducing portion 120 (RPM), and the feed roller position (at or above threshold, below threshold). "At or above" and "below" as used herein refer generally to a horizontally oriented feed roller(s) 132 with respect to an opposing surface 135, but it should be appreciated that similar terminology could be used for a vertically oriented feed roller(s) 132 in that the vertically oriented feed roller would be spaced at or away from an opposing vertical surface, such that "at or above" and "below" and as used herein applies to both horizontal and vertical oriented feed rollers. It should be appreciated that other parameters besides the engine speed (such as the drum RPM, belt characteristic, sheaves, etc.) may be monitored without departing from the scope hereof Further, the value plotted for the current to the PWM valve is an 'average' value, and the electrical signal may comprise pulses sent to the PWM valve 185 (e.g. during steps S772, S774, or iterations of step S718, S724) where the pulses are set at a constant frequency, typically 400 to 5000+Hz). Diagrams 900, 950 illustrate the following:

At t-1: prior to this time an operator used an input to accelerate the engine from low idle to high idle, and activate additional controls to initiate rotation of the feed roller 132. At the point of time just prior to t-1 the feed roller 132 is rotating. At t-1 the operator inserts material 10 (e.g. a branch, tree, etc.) as can be deduced by the fact that the feed roller 132 climbs up onto that branch at t-1.

Between t-1 and t-2: the controller 170 waits a period of time after the feed roller 132 is at or above the predetermined position threshold as indicated by sensor 171, and then it applies a minimum value (e.g. 200 mA) to the PWM valve 185 (e.g. implementing step S708, S760). The engine RPM remains at high idle at that point so the controller 170 deduces that the feed roller 132 is not effectively moving material and it immediately starts increasing the current to the PWM valve (e.g. step S774, S718). Diagram 900 illustrates the increase in a step function (S718). Diagram 950 illustrates the increase in a ramp-up function (S774).

At t-2 the engine speed starts dropping when the cutter drum of reducing portion 120 engages the material 10, indicating that the feed roller is effectively moving material. The controller 170 then starts to decrease the current to the PWM valve 185 to reduce the crush force applied by cylinders 175.

At t-3 the engine RPM drops to an auto-feed minimum, the controller 170 then automatically stops the feed roller 132.

Between t-3 and t-4 the feed roller 132 does not rotate, as the auto-feed algorithm stops the rotation of the feed roller 132 so that the cutter drum can be accelerated. During this time the current to the PWM valve is held at the same level (e.g Step S712, S764).

At t-4 the engine RPM reaches the auto-feed maximum and the auto-feed algorithm starts rotation of the feed roller 132.

Between t-4 and t-5 the engine RPM is not below the auto-feed maximum, the crush control algorithm running on controller 170 infers that the feed roller 132 is not effectively moving material 10, so controller 170 starts to increase (e.g., by a predetermined increase amount) the current to the PWM valve 185 (e.g. steps S774, S718).

t-5 to t-7 is a repeat of the auto-feed cycle.

Between t-7 and t-8 the engine RPM is not below the auto-feed maximum, the crush control algorithm running on controller 170 infers that the feed roller 132 is not effectively moving material, so the controller 170 starts to increase the current to the PWM valve 185.

At t-8 the engine speed drops below the auto-feed maximum so the crush control algorithm running on controller 170 infers that the feed roller 132 is effectively moving material (S770), and the controller 170 starts to decrease the current to the PWM valve 185 (step S772, S724).

Between t-8 and t-9 the engine RPM is between that auto-feed maximum and auto-feed minimum, the crush control algorithm running on controller 170 infers that the feed roller 132 is effectively moving material (S770), and the controller 170 reduces the current to the PWM valve 185 (step S772, S724).

At t-9 the engine RPM exceeds the auto-feed maximum, the crush control algorithm running on controller 170 infers that the feed roller 132 is not effectively moving material, so the controller 170 starts to increase the current to the PWM valve 185 (step S774, S718).

Between t-9 and t-11 another sequence is illustrated where the engine RPM drops, the crush control algorithm running on controller 170 infers that the feed roller 132 is effectively moving material, and reduces the current to the PWM valve 185, until reaching a minimum current, where it holds the current constant at that level (step S772, S724).

At t-11 the engine RPM rises, the crush control algorithm running on controller 170 infers that the feed roller 132 is not effectively moving material, and the controller 170 increases the current to the PWM valve 185.

Between t-12 and t-18 there are two auto-feed "cycles" wherein there are periods of time, the shaded areas, where the feed roller 132 does not rotate, as controlled by the auto-feed algorithm running on controller 170, during which the crush control algorithm is paused (step S764).

At t-18 the feed roller 132 position drops below the predetermined position threshold indicating that there is not material 10 under the feed roller, so the crush control algorithm running on controller 170 immediately reduces the current to the PWM valve to zero (step S756, S704).

Figure 4:
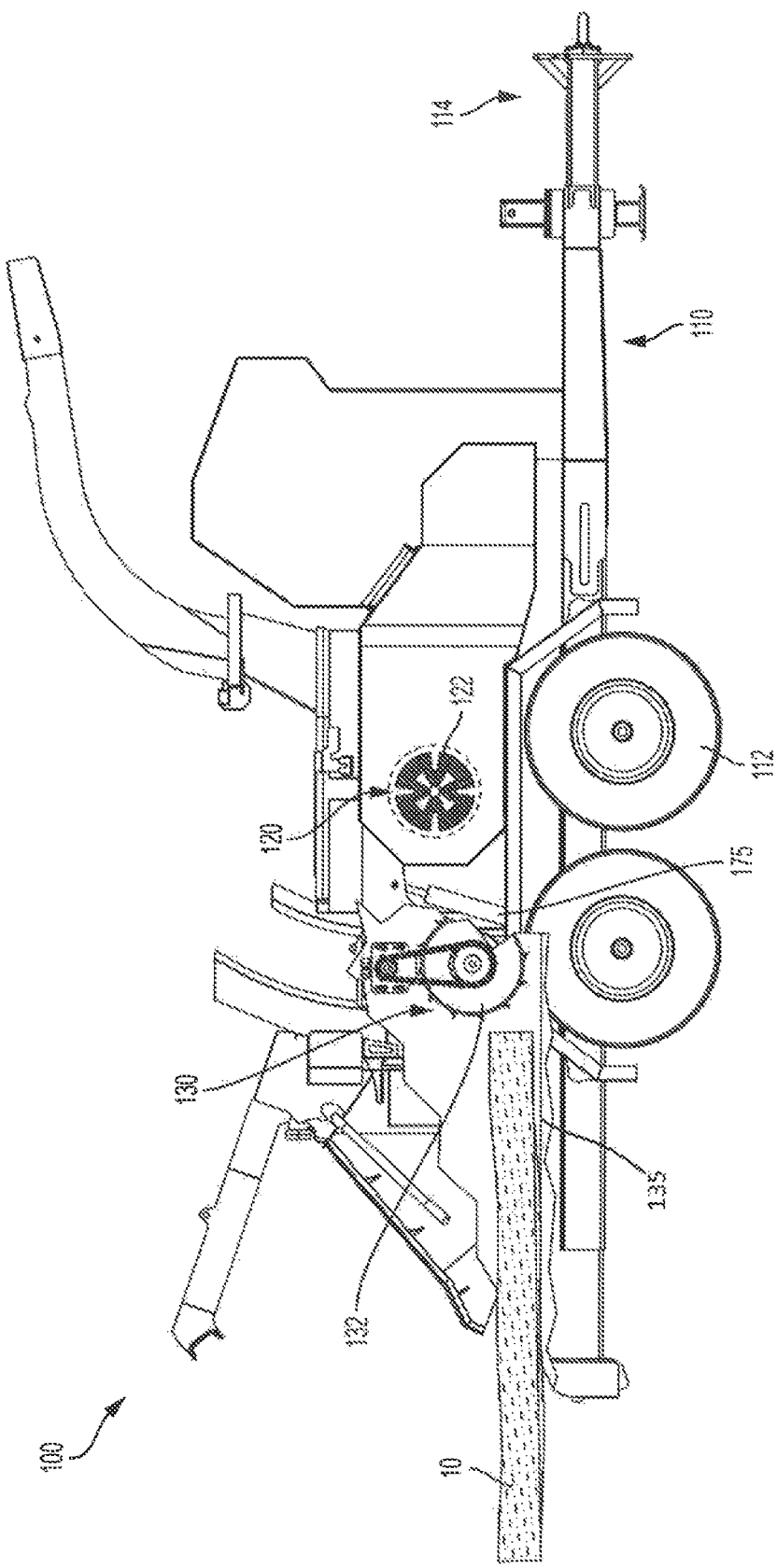
FIG. 4 is a side view of the chipper of FIG. 1, in use with a log and with a cutaway for illustration.
Figure 5A:
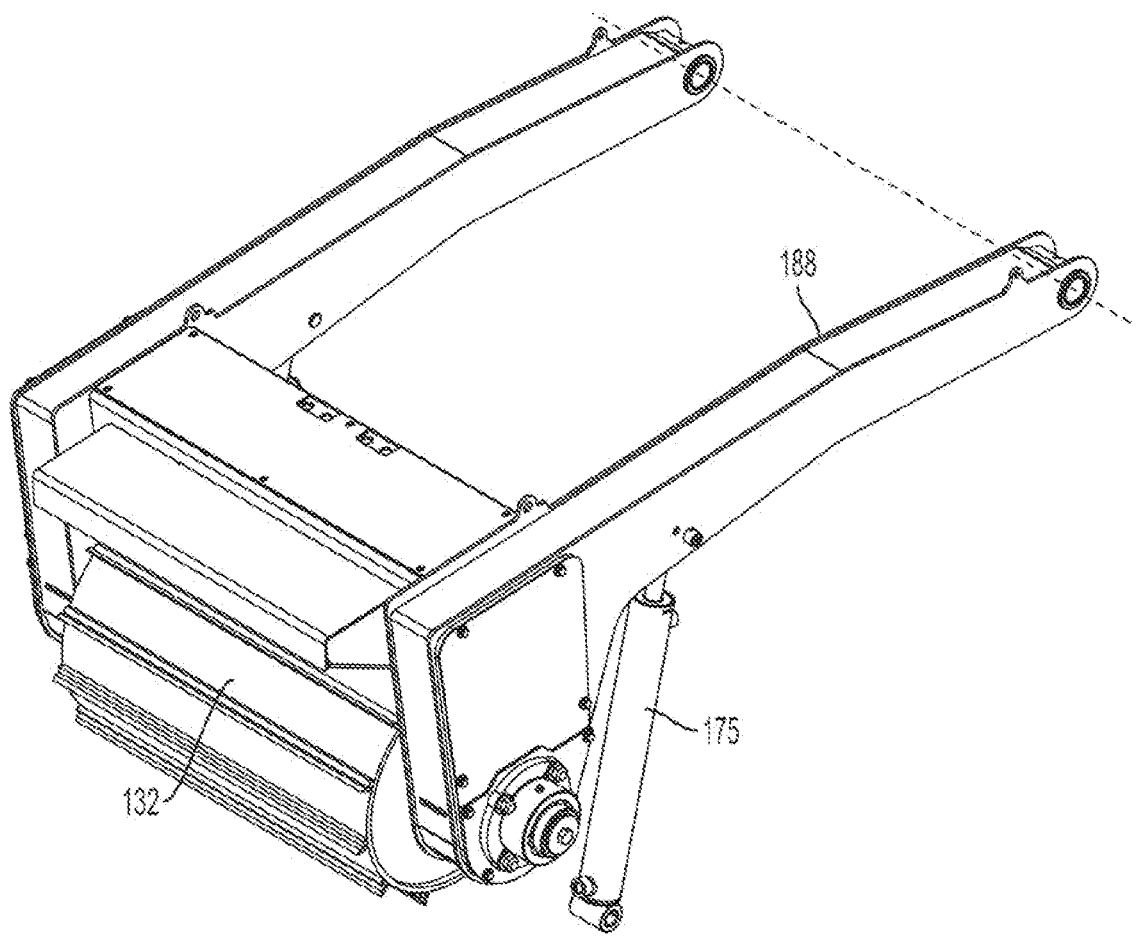
FIG. 5a is a perspective view of part of an infeed system from the chipper of FIG. 1.
Figure 5B:
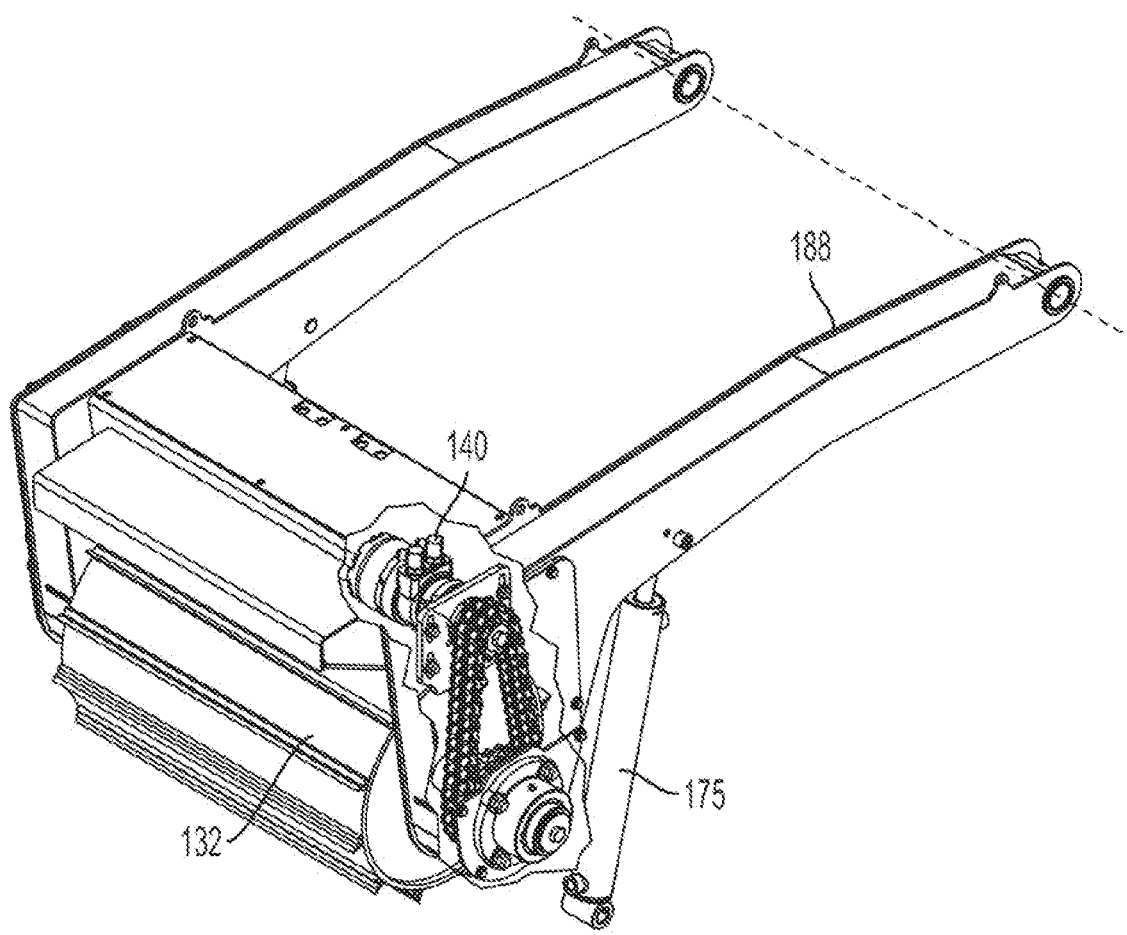
FIG. 5b shows the view of FIG. 5a, with covering removed for illustration.

Turning now to FIG. 4, FIG. 4 shows the chipper 100 in use with a tree 10. The tree 10 is moved along the infeed floor 135 to the feed roller 132, which moves the tree 10 to the reducing portion 120. Operation of the chipper 100, including rotational and crush force adjustment of the feed roller 132, is discussed above. In some embodiments, another feed roller (not shown) is provided generally at the infeed floor 135 such that the tree or debris 10 passes between two feed rollers before reaching the reducing portion 120.

A similar arrangement is shown in infeed portion 130' of the schematic view of FIG. 10. The infeed portion 130' is substantially similar to the infeed portion 130 described above, except as specifically noted and/or shown, or as would be inherent. For uniformity and brevity, corresponding reference numbers may be used to indicate corresponding parts, though with any noted deviations.

The infeed portion 130' is a generally vertically oriented infeed instead of a generally horizontally oriented infeed such as illustrated in FIGS. 1-4. And inside the input opening 133', the infeed portion 130' includes a second feed roller 132a' moved by hydraulic cylinder 175a'. Both feed rollers 132', 132a' may be actuated (for example moving closer to each other or further away) as described above regarding the feed roller 132 to apply crush force on material to be processed.

Figure 11:
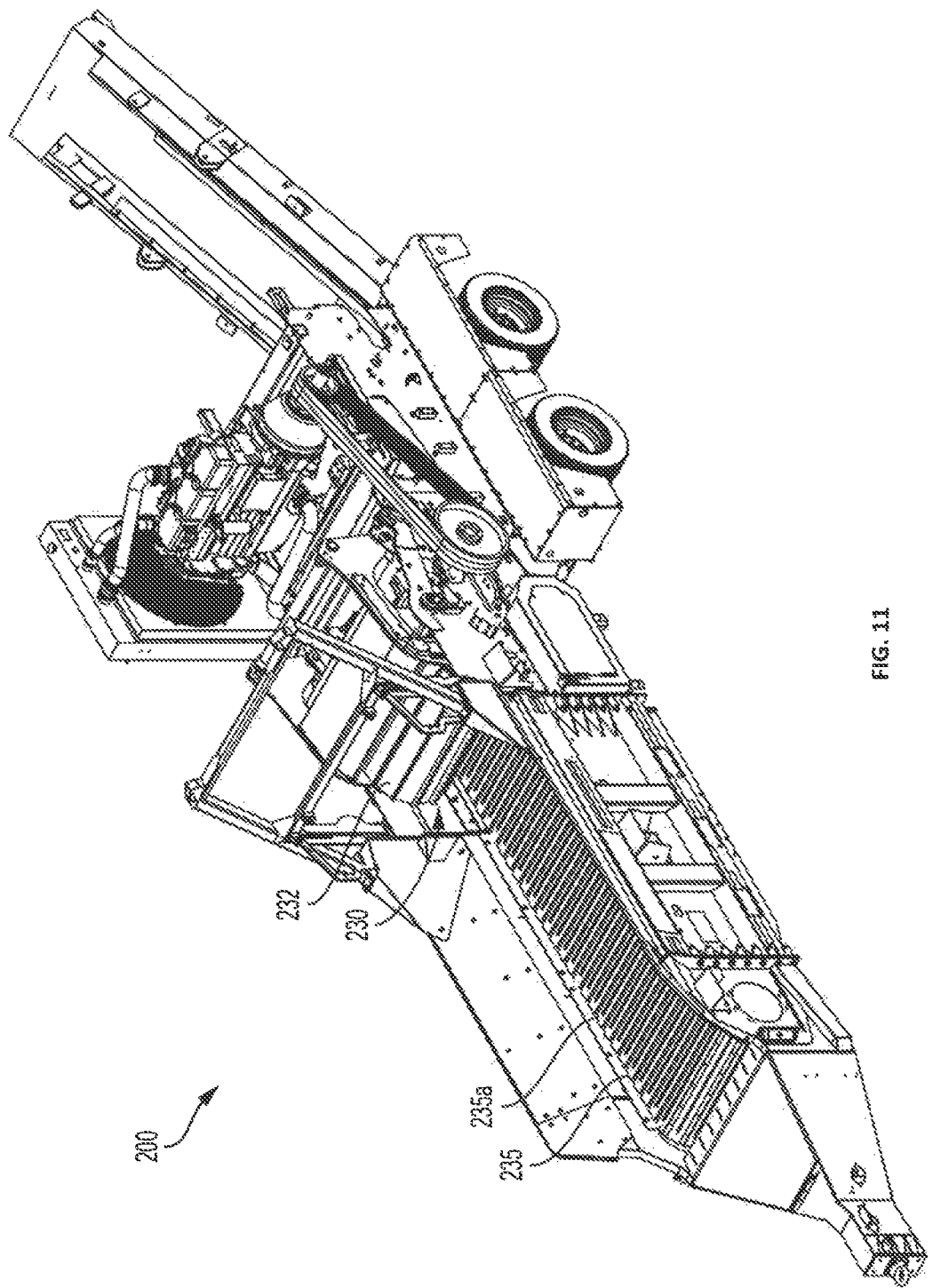
FIG. 11 is a perspective view of a grinder according to one embodiment of the current invention.

FIG. 11 shows a grinder 200 having a processing portion for crushing aggregate material into smaller pieces through repeated blows (e.g., using grinder blocks or a combination of grinder blocks and cutter elements as the primary comminuting mechanism), and an infeed portion 230 upstream that is substantially similar to the infeed portion 130 described above, except as specifically noted and/or shown, or as would be inherent. For uniformity and brevity, corresponding reference numbers may be used to indicate corresponding parts, though with any noted deviations.

The apparatus infeed portion 230 primarily differs from the infeed portion 130 shown in FIGS. 1 through 9B by having a powered conveyor 235a at the infeed floor 235 such that the aggregate material passes between the feed roller 232 and the powered conveyor 235a before reaching the processing portion. Those skilled in the art will appreciate that various embodiments of the grinder 200 may include a second feed roller movable like the feed roller 232 or a vertical feed configuration as described above.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and sub combinations are of utility and may be employed without reference to other features and sub combinations and are contemplated within the scope of the claims. The specific configurations and contours set forth in the accompanying drawings are illustrative and not limiting.

The invention claimed is:

1. An infeed system for a chipper or grinder, the chipper or grinder having a reducing portion wherein a material is processed into smaller pieces, the infeed system comprising:
 a hydraulic cylinder operatively connected to a feed roller and configured for adjusting an amount of crush force applied by the feed roller onto the material;
 a sensor configured to monitor an effectiveness of movement of the material by the chipper or grinder; and
 a controller of the chipper or grinder in data communication with the sensor and the hydraulic cylinder and configured to:
  (a) determine, from data received by the sensor, whether the material is being effectively moved to the reducing portion,
  (b) control the hydraulic cylinder to decrease the amount of crush force applied when the controller determines that the material is being effectively moved to the reducing portion,
  (c) control the hydraulic cylinder to increase the amount of crush force applied when the controller determines that the material is not being effectively moved to the reducing portion, and
  (d) continuously repeat the steps of (a)-(c) to optimize the force applied by the feed roller to the material while feeding the material toward the reducing portion;
 wherein the controller is configured to provide a first implementation of step (c) including increasing the amount of crush force according to a first increase level, and
 wherein the controller is configured to provide a second implementation of step (c) including increasing the amount of crush force according to a second increase level different from the first increase level to provide step-function increases in the amount of crush force;
 the controller configured to interrupt steps (a)-(d) when the feed roller is being rotated in a reverse direction or is not rotating and to maintain the amount of crush force applied at a level equal to an amount of crush force applied immediately prior to the interrupt of steps (a)-(d).

2. The infeed system of claim 1, further comprising a position sensor determining position of the feed roller with respect to an opposing surface; the controller configured to perform steps (a)-(d) when data from the position sensor indicates that the feed roller is at or above a predetermined position with respect to the opposing surface.

3. The infeed system of claim 1, the step (a) including the controller being configured to determine whether a signal generated by the sensor is periodic between a high RPM value of the reducing portion while the reducing portion is not reducing the material, and a transition to a low RPM value of the reducing portion while the reducing portion is reducing the material.

4. The infeed system of claim 1, the controller configured to perform step (b) when the data from the sensor indicates a low RPM value of the reducing portion for a time period longer than a given threshold.

5. The infeed system of claim 1, the controller configured to perform step (c) when the data from the sensor indicates a high RPM value of the reducing portion for a time period longer than a given threshold.

6. The infeed system of claim 1, the data being received from the sensor being selected from the group consisting of: an engine speed, an engine load, an engine torque, a fuel consumption, a speed of a belt or sheaves of the infeed system, a rotational speed off the feed roller or the reducing portion, a vibration, and a material presence in a discharge area signal.

7. The infeed system of claim 1, further comprising a user control in data communication with the controller to selectively provide a boost signal to the controller, such that, upon detection of the boost signal, the controller is configured to increase the amount of crush force applied by a set amount, up to a maximum setting.

8. The system of claim 1, the effectiveness of movement including a feed roller interaction with the material, whether the material is being expelled from the chipper or grinder, an engine load, torque, or speed, a speed of a belt or sheaves of the infeed system, and/or a rotational speed of the reducing portion.

9. The system of claim 1, the sensor being an optical sensor for capturing images of the feed roller engaging the material, the effectiveness of movement including the feed roller interaction with the material.

10. The system of claim 1, the sensor being configured to monitor discharge of the material from the chipper or grinder, the effectiveness of movement including whether the material is being discharged.

11. The infeed system of claim 1, the first increase level being an increase to a minimum predetermined optimal crush force range based on characteristics of the chipper or grinder.

12. The infeed system of claim 1, wherein the second implementation of step (c) includes increasing the amount of crush force wherein the second increase level is smaller than the first increase level.

13. A method for infeed control for a chipper or grinder, comprising the steps of:
   (a) monitoring a sensor to determine whether a material is being effectively moved toward a reducing portion of the chipper or grinder;
   (b) controlling a hydraulic cylinder to decrease an amount of crush force applied by a feed roller when the material is being effectively moved to the reducing portion until reaching a condition wherein the material is not being moved to the reducing portion or until a minimum crush force is reached;
   (c) controlling the hydraulic cylinder to increase the amount of crush force applied when the material is not being effectively moved to the reducing portion until reaching a condition wherein the material is being moved to the reducing portion,
   (d) continuously repeating the steps of (a)-(c) to optimize the force applied by the feed roller to the material while feeding the material toward the reducing portion.

14. The method of claim 13, the steps of (a)-(d) being performed when the feed roller is at or above a predetermined position with respect to an opposing surface.

15. The method of claim 13, further comprising interrupting any of steps (a)-(d) when the feed roller is being rotated in a reverse direction or is not rotating.

16. The method of claim 13, a first implementation of step (c) including increasing the amount of crush force according to a first increase level.

17. The method of claim 16, the first increase level being an increase to a minimum predetermined optimal crush force range based on characteristics of the chipper or grinder.

18. The method of claim 16, a second implementation of step (c) including increasing the amount of crush force according to a second increase level different from the first increase level.

19. The method of claim 18, wherein the second implementation of step (c) includes increasing the amount of crush force wherein the second increase level is smaller than the first increase level.

20. The method of claim 13, the step (a) including determining whether a signal generated by the sensor is periodic between a high RPM value of the reducing portion while the reducing portion is not reducing the material, and a transition to a low RPM value of the reducing portion while the reducing portion is reducing the material.

21. The method of claim 13, the step (c) being performed when data from the sensor indicates a high RPM value of the reducing portion for a time period longer than a given threshold.

22. The method of claim 13, step (a) including monitoring an operating condition of the chipper or grinder, the operating condition being selected from the group consisting of: an engine speed, an engine load, an engine torque, a fuel consumption, a speed of a belt or sheaves of the infeed system, a rotational speed off the feed roller or the reducing portion, a vibration, and a material presence in a discharge area signal.

23. The method of claim 13, step (a) including capturing images of the feed roller engaging the material with an optical sensor and monitoring the effectiveness of movement of the material by analyzing the feed roller interaction with the material within the images.

24. The method of claim 13, step (a) including monitoring discharge of the material from the chipper or grinder to monitor effectiveness of movement of the material by determining whether the material is being discharged.

25. The method of claim 13, further comprising:
   interrupting steps (a)-(d) when the feed roller is being rotated in a reverse direction or is not rotating and maintaining the amount of crush force applied at a level equal to an amount of crush force applied immediately prior to the interrupting of steps (a)-(d).

* * * * *